(12) United States Patent
Ojard et al.

(10) Patent No.: US 7,142,553 B1
(45) Date of Patent: Nov. 28, 2006

(54) OFF-LINE BROADBAND NETWORK INTERFACE

(75) Inventors: Eric Ojard, San Francisco, CA (US); Jason Trachewsky, Menlo Park, CA (US); John T. Halloway, Woodside, CA (US); Edward H. Frank, Portola Valley, CA (US); Kevin H. Peterson, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/567,961

(22) Filed: May 9, 2000

Related U.S. Application Data

(63) Continuation of application No. 09/037,357, filed on Mar. 9, 1998, now Pat. No. 6,130,894.

(51) Int. Cl.
  *H04L 12/28* (2006.01)
(52) U.S. Cl. .................. 370/421; 370/445; 370/463
(58) Field of Classification Search ................ 370/421, 370/445, 463, 419, 420, 389, 392, 446
  See application file for complete search history.

(56) References Cited

U.S. PATENT DOCUMENTS

| | | | |
|---|---|---|---|
| 3,795,865 A | 3/1974 | Armstrong | 325/42 |
| 4,101,834 A | 7/1978 | Stutt et al. | 325/42 |
| 4,281,412 A | 7/1981 | Wissel et al. | 375/86 |
| 4,324,001 A | 4/1982 | Rhodes | 375/90 |
| 4,447,871 A | 5/1984 | Terada et al. | 364/200 |
| 4,462,108 A | 7/1984 | Miller | 375/97 |
| 4,516,239 A | 5/1985 | Maxemchuk | 370/85 |
| 4,554,656 A | 11/1985 | Budrikis et al. | 370/85 |
| 4,661,902 A | 4/1987 | Hochsprung et al. | 364/200 |
| 4,706,246 A | 11/1987 | Kume | 370/85 |
| 4,774,704 A | 9/1988 | Gass et al. | 370/29 |
| 5,023,869 A | 6/1991 | Grover et al. | 370/84 |
| 5,111,453 A | 5/1992 | Morrow | 370/85.13 |
| 5,170,415 A | 12/1992 | Yoshida et al. | 375/80 |
| 5,177,734 A | 1/1993 | Cummiskey et al. | 370/32.1 |
| 5,278,870 A | 1/1994 | Mays et al. | 375/99 |
| 5,396,519 A | 3/1995 | Betts et al. | 375/296 |

(Continued)

FOREIGN PATENT DOCUMENTS

EP  0 640 927 A1  3/1995

(Continued)

OTHER PUBLICATIONS

Forney, Jr., G. David, et al., "Combined Equalization and Coding Using Precoding," IEEE Communications Magazine, Dec. 1991, pp. 25-33, V. 29, No. 12, New York, USA.

*Primary Examiner*—Wellington Chin
*Assistant Examiner*—Phuongchau Ba Nguyen
(74) *Attorney, Agent, or Firm*—McAndrews, Held & Malloy, Ltd.

(57) ABSTRACT

A network interface is presented that receives packet data from a shared medium and accomplishes the signal processing required to convert the data packet to host computer formatted data separately from receiving the data packet. The network interface receives the data packet, converts the analog signal to a digitized signal, and stores the resulting sample packet in a storage queue. An off-line processor, which may be the host computer itself, performs the signal processing required to interpret the sample packet. In transmission, the off-line process converts host-formatted data to a digitized version of a transmission data packet and stores that in a transmission queue. A transmitter converts the transmission data packet format and transmits the data to the shared medium.

102 Claims, 27 Drawing Sheets

U.S. PATENT DOCUMENTS

| | | | |
|---|---|---|---|
| 5,465,267 A | 11/1995 | Todoroki | 375/279 |
| 5,559,561 A | 9/1996 | Wei | 348/470 |
| 5,689,510 A | 11/1997 | Jacquet et al. | 370/445 |
| 5,710,793 A | 1/1998 | Greenberg | 375/232 |
| 5,751,701 A | 5/1998 | Langberg et al. | 370/281 |
| 5,832,233 A | 11/1998 | Hall et al. | 395/200.66 |
| 5,864,515 A | 1/1999 | Stinchcombe | 367/103 |
| 6,009,122 A | 12/1999 | Chow | 375/260 |
| 6,035,087 A | 3/2000 | Bonicel et al. | 385/109 |
| 6,052,475 A * | 4/2000 | Upton | 382/125 |

FOREIGN PATENT DOCUMENTS

| | | |
|---|---|---|
| EP | 0 789 302 A1 | 8/1997 |
| WO | WO 96/28754 | 9/1996 |

* cited by examiner

FIG. 14 Modulation

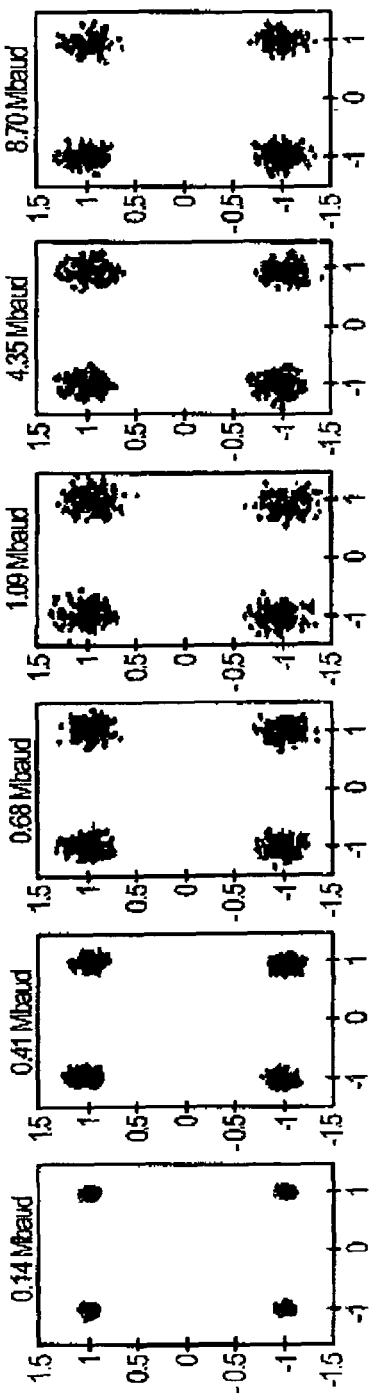

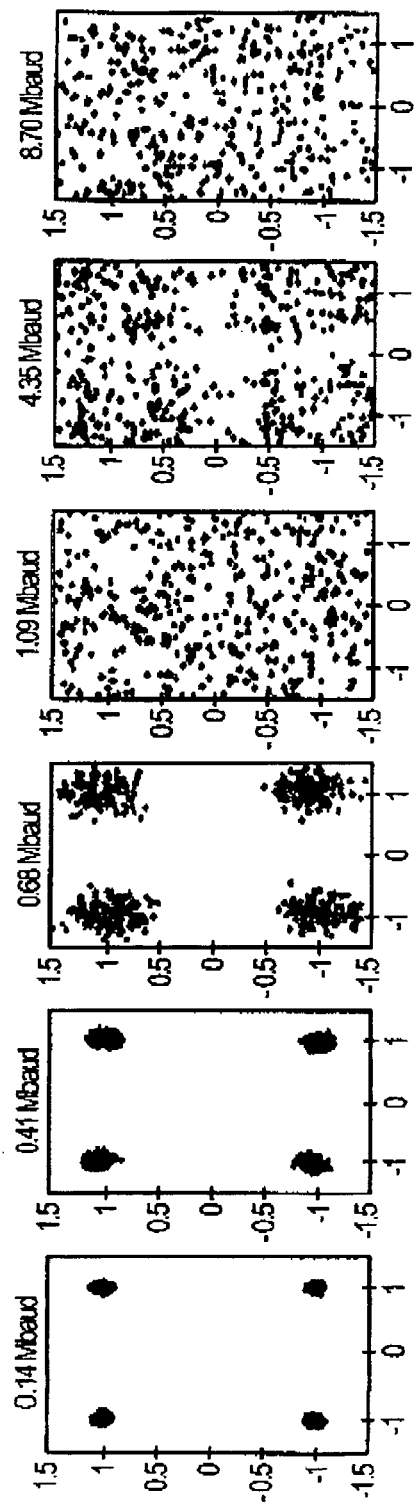

Sample Training Sequence

FIG. 25

OFF-LINE BROADBAND NETWORK INTERFACE

CROSS-REFERENCE TO RELATED APPLICATIONS

This application is a continuation of U.S. application Ser. No. 09/037,357 (now U.S. Pat. No. 6,130,894), filed Mar. 9, 1998, which is hereby incorporated herein by reference in its entirety.

CROSS REFERENCE TO MICROFICHE APPENDIX

Appendix A, which is a part of the present disclosure, is a microfiche appendix consisting of 2 sheets of microfiche having 114 frames. Microfiche appendix A includes a software program operable on a host processor in order to drive a hardware card shown in appendix B.

Appendix B, which is a part of the present disclosure, is a microfiche appendix consisting of one (1) sheet of microfiche having 26 frames. Microfiche appendix B includes circuit diagrams and chip design diagrams for an embodiment of the invention as implemented on a circuit board.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

This and other embodiments are further described below.

BACKGROUND

1. Field of the Invention

This invention relates to receiving data from a physically shared medium in a network interface where a portion of the required signal processing is accomplished off-line, independent of receiving the data.

2. Background

Packet-switched communication networks are often used in the transmission of data over shared communication channels. Shared communication channels may exist on a variety of physical media such as copper twisted-pair, coaxial cable, power lines, optical cable, wireless RF (radio frequency) and wireless IR (infrared). A system that has found wide-spread commercial use is Ethernet. (see "Multipoint Data Communication System With Collision Detection," U.S. Pat. No. 4,063,220, issued Dec. 13, 1977 to Metcalfe et al). A multiple-access technique is used in systems such as Ethernet to coordinate access among several stations contending for use of the shared channel. Ethernet is based on 1-persistent Carrier Sense Multiple Access with Collision Detect (CSMA/CD) using a collision resolution algorithm referred to as Binary Exponential Backoff (BEB).

A typical packet-switched network is shown in FIG. 1. In FIG. 1, stations 102, 104, 105 and 106 are connected to a shared medium 101. Although only four stations are shown in FIG. 1, any number of stations may be connected to shared medium 101. Shared medium 101 may be any of the variety of available physical media including copper twisted-pair, coaxial cable, power lines, optical cable and wireless (RF or IR).

Station 102 shows a network interface 103. All of the stations connected to common shared medium 101 have a network interface similar to network interface 103. Network interface 103 controls access to shared medium 101 from host station 102 and provides conversion between host station formatted data and data packets on shared medium 101.

FIG. 2 shows a typical Ethernet network interface 210 installed in a host station 220. See "Carrier Sense Multiple Access with Collision Detection (CSMA/CD) Access Method and Physical Layer Specification," ANSI/IEEE Std. 802.3, Fifth Edition 1996-07-29. Ethernet network interface 210 is a typical network interface 103 (FIG. 1) providing access to shared medium 101 from host station 220.

Typically, signal processing functions in network interface 210 are grouped into a physical (PHY) layer 200 and a Media Access Control (MAC) layer 201. Physical layer 200 (the lowest level layer of the interface) interfaces to MAC layer 201. Signals ReceiveBit (RB), TransmitBit (TB), collisionDetect (CD), and carrierSense (CS) are exchanged between PHY layer 200 and MAC layer 201. Media access control (MAC) layer 201 implements an access control algorithm and translates between a sample packet bit stream output from PHY layer 200 and a host formatted data packet bit stream compatible with host station 220.

In PHY layer 200, a hybrid 209 couples both receive and transmit elements of PHY layer 200 to shared medium 101. The receive elements include a CODEC/DEMOD 203 and a carrier sense 202. CODEC/DEMOD 203 in conjunction with Carrier Sense 202 detects the presence of a transmission on shared medium 101. Carrier sense 202 outputs the carrierSense (CS) signal indicating whether or not a data packet on shared medium 101 is detected. Further, CODEC/DEMOD 203 converts analog data packets received by hybrid 209 from shared medium 101 into the sample packet bit stream from PHY layer 200. Typically, CODEC/DEMOD 203 includes a controlled gain amplifier, anti-aliasing and receive filters, and an analog to digital converter. The anti-aliasing and receive filters of CODEC/DEMOD 203 carry out the symbol processing required to counter the effect that channel distortion by shared medium 101 has on a received data packet. Therefore, a majority of the signal processing required to receive and process data packets from shared medium 101 is accomplished in real-time in CODEC/DEMOD 203. CODEC/DEMOD 203 must be capable of processing data packets from shared medium 101 at the transmission rate of shared medium 101. The output of CODEC/DEMOD 203, the sample packet, is a nearly completely processed form of the received data packet and is substantially converted to host data format.

The transmit elements of PHY layer 200 include a CODEC/MOD 205. CODEC/MOD 205 typically includes a controlled gain amplifier, a digital to analog converter and reconstruction filters. CODEC/MOD 205 converts an output bit stream into appropriate transmit data packets which are transmitted on shared medium 101 by Hybrid 209. Collision detect 204 compares the transmit data packets being transmitted to received data packets to detect the presence of other transmissions from other stations. A data collision occurs when another station is transmitting a data packet during the time when station 210 attempts to transmit a data packet. Collision detect 204 generates the collisionDetect (CD) signal indicating whether or not a data collision has been detected.

Physical layer 200 outputs signal CD from collision detect 204 and signal CS from carrier sense 202 to MAC controller 206 in MAC layer 201. PHY layer 200 also outputs the receiveBit (RB) signal to RX Queue 207 of MAC layer 201 and receives the transmitBit (TB) signal from TX Queue 208 of MAC layer 201.

RX Queue 207 receives the sampled packet in a sequence of receiveBit (RB) signals from CODEC/DEMOD 203. When the sample packet is complete and stored in RX Queue 207, host processor 230 of station 220 is alerted and the sample packet is transmitted to processor 230.

Buffer TX Queue 208 receives a transmit packet in sample packet format from processor 230 in station 220. TX Queue 208 stores the transmit packet and, in response to a signal from MAC controller 206, alerts CODEC/MOD 205 of the presence of the transmit packet. CODEC/MOD 205 receives the transmit packet from TX Queue 208, converts the transmit packet to data packet format, and transmits the data packet to hybrid 209 for transfer to shared medium 101. Both TX Queue 208 and RX Queue 207 hold data that is substantially in host data format and the signal processing required for receiving data from shared medium 101 or transmitting data to physical medium 101 is accomplished in CODEC/DEMOD 203 and CODEC/MOD 205, respectively.

MAC controller 206 controls the timing of transmit data packets through TX Queue 208 to CODEC/MOD 205 of PHY 200. MAC controller 206 outputs a controller signal to TX Queue 208, the controller signal indicating to TX Queue 208 when it is desirable to transmit a data packet onto shared medium 101.

Implementations of CODEC/DEMOD 203 and CODEC/MOD 205 depend on the signaling and modulation format used in shared medium 101 and are strongly dependent on the required system performance and the overall channel characteristics. An industry trend has been to use more sophisticated modulation techniques to transport higher bit rates over more severely impaired channels, causing increasing complexity in implementation of CODEC/DEMOD 203 and CODEC/MOD 205.

In FIG. 2, interface 210 is shown implementing sophisticated baseband or passband signaling using high spectral efficiency signal processing. Prior practice has commonly been based on baseband signaling, with relatively simple physical (PHY) layer processing. In this case, FIG. 2 can be simplified with CODEC/DEMOD 203 replaced with a phase-lock loop and sample comparator and CODEC/MOD 205 replaced with a Manchester coder and output driver.

The complexity, cost, chip area, and power dissipation requirements of physical interface 200 grows with the symbol (or baud) rate and the signal processing required per symbol to filter, resample, equalize, demodulate, and recover timing on the received data. These functions of physical layer 200 are determined by the degree of impairment in the channel and the spectral efficiency desired of the modulation technique. For example, in systems transporting multi-megabit/sec signals over existing twisted pair wiring (telephone infrastructure) using 8 bit/baud 256-QAM modulation on a channel with an impulse response that extends over several baud times requires several hundred (~500) arithmetic operations per baud. A baud rate of 2 Megabaud requires over a billion arithmetic operations per second.

The level of complexity required to process data as described above may be appropriate for certain devices that require access to the full channel data rate of the shared medium. However, conventional interface methods also require low data rate devices, which only require a fraction of the channel data rate, to carry the burden, and expense, of a full-speed network interface such as the one described above.

SUMMARY OF THE INVENTION

According to the present invention, an interface that optimizes the allocation of hardware and software resources for a network interface using packet data communications with complex modulation formats is presented. The symbol processing functions are decoupled from the real-time media access functions, allowing much of the symbol processing to be accomplished off-line and independent of the actual receipt of data packets.

A data packet destined for a particular station, the host station, is received from a shared medium (such as Ethernet) and partially processed by receiver elements in the host station to obtain a sampled packet. The sampled packet is a sampled and digitized version of the data packet and has experienced little signal processing by the network interface itself, although in some embodiments portions of the signal processing tasks are accomplished within the network interface. The sampled packets are held in a buffer for later processing by other resources of the host station not involved in the actual receipt of the data packets.

Data from the host station to be transmitted to the shared medium is converted from host data to a transmit packet in sample packet format and buffered in a transmit queue. The transmit packet is transmitted to the shared medium by the network interface when the MAC controller allows access to the shared medium.

The signal processing rate of the system is therefore scaled to the data rates of the individual station instead of the potentially much higher transmission rate of the network connected to the shared medium. Furthermore, embodiments of the invention compensate for latencies caused by the scheduling of processor resources among other tasks, relaxing the real-time requirements for that processing. Furthermore, in an embodiment where the signal processing is performed by a shared computing element multiplexed with other tasks, the process load is reduced to just what is required for useful communication (goodput) and the shared processor is not loaded when the network is idle or carries data packets destined for other stations.

A packet-based protocol usable with embodiments of this invention is disclosed in U.S. patent application Ser. No. 08/853,683, filed May 9, 1997 and assigned to the assignee of this application, entitled "Method and Apparatus for Reducing Signal Processing Requirements for Transmitting Packet-Based Data", incorporated herein by reference in its entirety. Using this packet-based protocol, or other packet-based protocols, in embodiments of the present invention allows production of higher rate "software modems" that utilize some of the processors present in the host computer. In addition to packet based data transmission, some embodiments are capable of recognizing the start of a data packet within a continuous transmission of bits on a shared medium.

In most embodiments, adequate buffering of sampled analog packet signals is provided so that momentary overload of the interface caused by packets arriving faster than the throughput capacity will not result in dropped transmissions. This buffering need only be provided for sampled signals that are destined for that particular station and not for the entire throughput of the shared medium. Often, the sample packet formed by the modem function, a sampled and digitized form of the data packet, is only slightly larger than the fully processed, host compatible digital packet. Buffering, therefore, may be accomplished by various means including memory on the same chip as the network interface, RAM chips attached to the network interface chip, First-in First-out (FIFO) memory attached to the network interface chip, or RAM shared with the host processor.

Network interfaces according to the present invention are easily upgraded for improved algorithms and implementation, for added compatibility with newer communication standards, and for scaleable communication performance resulting from increased host processor performance because the signal processing is accomplished by central programmable processors. In addition, network interfaces embodying this invention can lead to lower power dissipation in the network interface electronics and occupy less chip area.

In some embodiments, different signaling and modulation formats are mixed on a single shared medium. The off-line processing identifies the data packet's format and executes algorithms specific to that format. The resulting stream of heterogeneous packets in sample packet form are intermixed in the same queues and handled by the same physical interfaces. The dynamic per-packet signal processing has at least two applications: allowing the signal processing complexity to be adapted to the joint capabilities of sending and receiving stations; and allowing the signal processing to be adapted to unique channel characteristics between sending and receiving stations.

An alternative embodiment of the current invention provides multiple RX CODEC and TX CODEC units connected to the receive and transmit queues. This provides for a multi-channel interface that could be used for interfaces to multiple media segments or interfaces to multiple frequency division multiplexed channels on one media segment with lower complexity than that required to replicate the entire network interface.

Another embodiment of the invention includes partitioning of the signal processing function into an application-specific hardware accelerator coupled with off-line software in a general-purpose host processor. Certain computationally intensive sub-functions of the signal processing are allocated to the hardware accelerator for increased throughput of the combined system.

These embodiments of the invention are further discussed below with reference to the following figures.

BRIEF DESCRIPTION OF THE FIGURES

FIGS. 18A through 18F show a 4-CAP constellation for several baud rates on the network shown in FIG. 16 if all of the terminal jacks in the network are properly terminated.

FIGS. 20A through 20F show a 4-CAP constellation for several baud rates on the network shown in FIG. 16 where the terminal jacks of the network are not properly terminated.

FIG. 25 shows a sample equalizer training sequence for use with the method shown in FIG. 24.

In the figures, the same or similar components appearing in multiple figures are identically labeled.

DETAILED DESCRIPTION

Figure 3:
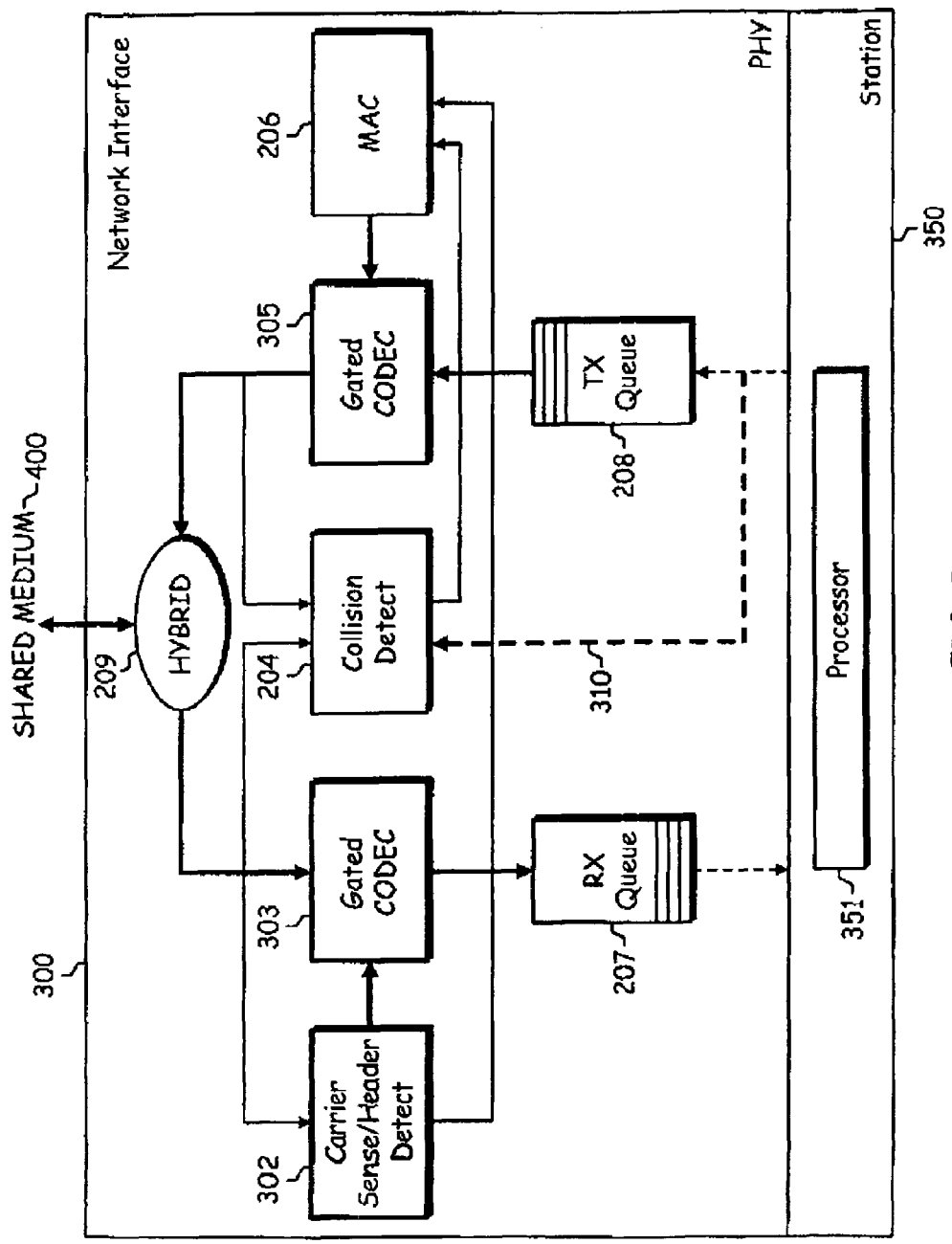
FIG. 3 shows a network interface according to the current invention.

According to the present invention, the signal processing required for receiving or transmitting a bit data stream from a shared medium is accomplished by a processor independent of the network interface. FIG. 3 shows a network interface 300 according to this invention. Network interface 300 interfaces a host station 350 to a shared medium 400. Shared medium 400 may physically be one of several media capable of carrying signals, including copper twisted-pair, coaxial cable, power lines, optical cable, wireless RF and wireless IR. Shared medium 400 supports a multiple access protocol such as Ethernet. In addition, embodiments of this invention are applicable to unconditioned wiring on the shared medium that can result in severe channel distortion. The nature of the channel distortion will generally be different for each pair of stations on the network, therefore equalization parameters will be different for each path on the network, i.e., there is generally a different set of equalization parameters for every pair of stations. Equalization parameters and equalizer training is discussed in a later section of this document (see the Channel Estimation, Equalizer Training, and Header Processing section).

Figure 4:
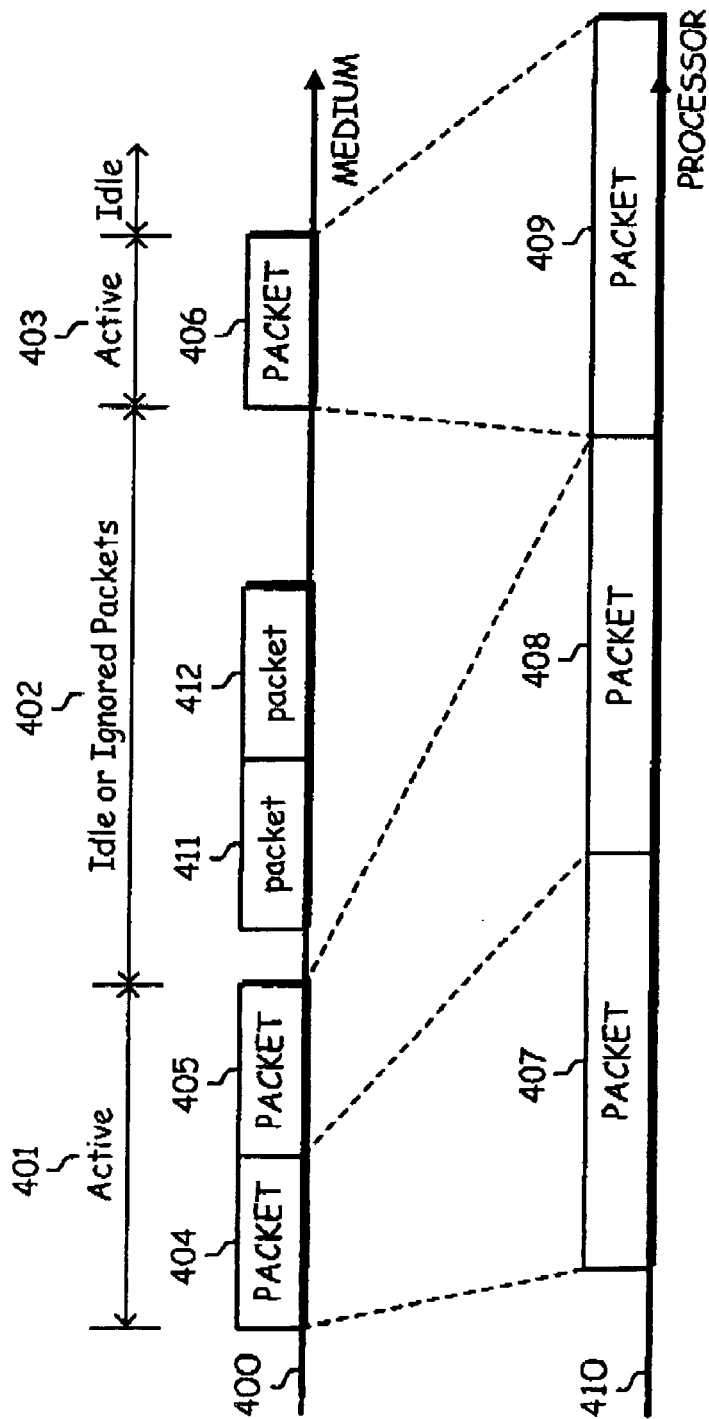
FIG. 4 illustrates an example of off-line processing of packet data in comparison with transmission time intervals for the same data.

FIG. 4 shows time-lines of a series of data packet transmissions present on shared medium 400. In FIG. 4, data packets 404, 405 and 406 are transmissions destined for receiving host station 350. Data packets 411 and 412 are destined for other stations connected to shared medium 400 and not host station 350. Network interface 300 is capable of receiving any sequence of data packets. The number of data packets received in a sequence is limited only by the size of a buffering memory, RX QUEUE 207 in FIG. 3, and the actual rate of signal processing in station 350. Signal processing removes sample packets from the RX QUEUE 207 and therefore reduces the number of data packets in the buffering memory.

Data packets on physical medium 400 are characterized and treated as analog signals. The data packet parameters used to describe the data packet include a modulation rate, a modulation coding format, and a data packet format. In some embodiments, the parameters can vary between data packets. In some embodiments, the characteristics of the data packets are adjusted by the transmitting station to optimize transmission over the physical medium channel. The characteristics of the data packets may also be optimized according to the characteristics of the transmitting host station and the receiving host station. Optimization of the characteristics of the data packet involves the transmitting station predicting the channel characteristics between the transmitting station and the host station adjusting the characteristics of the data packet for optimum transmission.

Generally, a data packet contains a payload data and a header. The header contains information about the data packet. The header may include one or more of the following: destination, source of the data packet, modulation rate, modulation coding format, baud-timing information, an equalizer training sequence and payload data format. The payload data includes the data that is being transmitted. The payload data and the header need not be identically modulated.

The time-line of processor 351, time-line 410 in FIG. 4, shows timing of the signal processing accomplished by host station 350 after receipt of a data packet. In FIG. 4, the length of each packet corresponds to an amount of time. For example, the length of data packet 404 corresponds to the time required to receive data packet 404 and the length of process packet 407 represents the time required for symbol processing of the corresponding data packet. In FIG. 4, processing packet 407 corresponds to data packet 404; processing packet 408 corresponds to data packet 405; and processing packet 409 corresponds to data packet 406. Data packets present on shared medium 400 in time slot 402, data packets 411 and 412, are ignored by most embodiments of network interface 300 because those data packets are not designated for receipt by station 350. Only time slots such as slots 401 and 403 of FIG. 4 hold data packets destined for receipt by station 350 and therefore those data packets—404, 405 and 406—are received for processing into network interface 300. If data packets 411 and 412 are received for storage in network interface 300, additional memory is required in the storage buffer.

Referring to FIG. 3, data packets such as data packets 404, 405, 406, 411 and 412 are received into station 350 by hybrid 209. Hybrid 209 is a diplexer which receives data packets from shared medium 400 and directs the received data packets to receiving functions of network interface 300. Hybrid 209 also receives transmit data packets from transmit functions of network interface 300 for transmission to shared medium 400. The receive functions of network interface 300 include gated RX CODEC 303 and carrier sense and header detect 302. The transmit functions of network interface 300 include gated TX CODEC 305 and MAC controller 206.

Carrier sense and header detect 302 monitors the received signal from hybrid 209 and detects the presence of a data packet on shared medium 400. Carrier sense and header detect 302 then outputs a carrierSense (CS) signal when the beginning of the data packet is detected. Detection of a data packet on shared medium 400 is based on recognition of packet boundaries embedded in the continuously received signal from shared medium 400.

The beginning of a data packet is easily recognized and extracted from burst-oriented packet format multipoint communications over a shared medium. However, some embodiments of the invention are capable of recognizing and extracting data packets from a continuous bit stream. One method for recognizing such boundaries in burst-oriented transmission is disclosed in previously cited copending U.S. patent application Ser. No. 08/853,683 entitled "Method and Apparatus for Reducing Signal Processing Requirements for Transmitting Packet-Based Data." Methods for recognizing the boundaries of a data packet in continuous bit stream modulation include: marking the boundaries of packet data with unique symbol sequences on either side of the packet and detecting those sequences by a detector designed to respond to those unique sequences; and marking boundaries with side-band framing signals carried on separate frequency division carriers, e.g. one carrier in a multi-tone carrier system, or a separate side-band carrier in a single-carrier system. The preferred embodiment recognizes data packets from burst-oriented multipoint communications over the shared medium.

Figure 21:
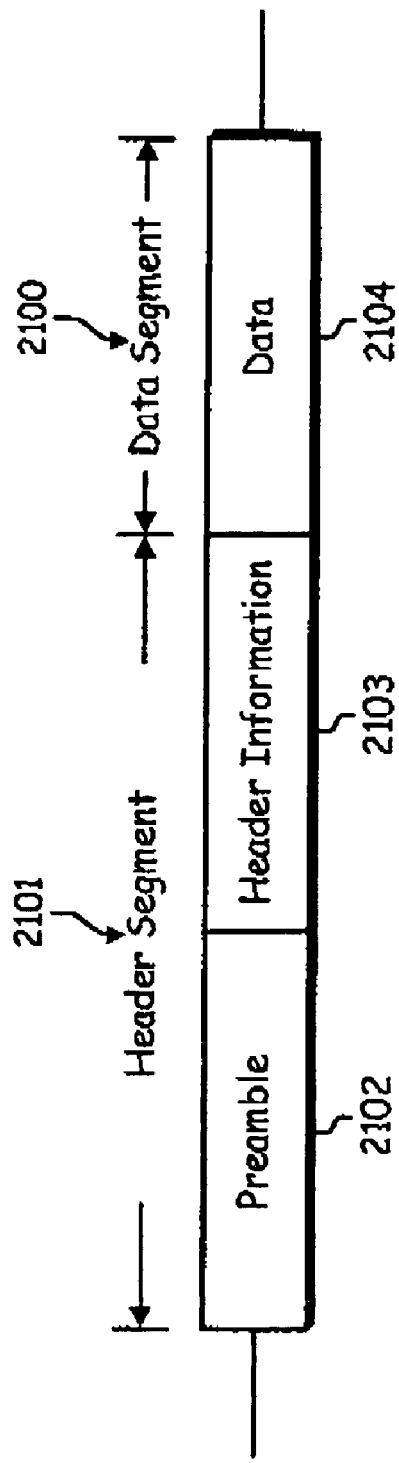
FIG. 21 shows a sample data packet having a preamble and a header information in the header and a payload data.

In most embodiments, stations communicate by sending short data packets. Each data packet consists of a header followed by a payload data. FIG. 21 shows a data packet 2100 with a header 2101 and a payload data 2104. Header 2101 has a preamble 2102 and a header information 2103. Header 2101 indicates the source and destination of the packet and possibly other information. Header 2101 may also include a preamble 2102 having a training sequence to enable equalizer training or a multi-tone signal for timing synchronization. Each station has its own unique destination address. In addition, there may be a designated broadcast address and a small number of multi-cast group addresses. Hence, a single host station 350 (FIG. 3) will have one or more destination addresses of interest.

The process of decoding a data packet has a high start-up cost. Before any symbols can be decoded, the receiver must be trained to correct for channel distortion and/or timing offset. The process of training the receiver involves a large number of multiply operations, which can consume a large number of cycles on the host processor. In some embodiments, training the receiver occurs when the network on shared medium 400 is started. Equalizer parameters representing a channel model between each pair of stations are stored in host station 350 for use in decoding data packets. In other embodiments, where preamble 2102 includes a training sequence, equalizer training occurs for each data packet received.

A typical network may have several stations, so it is possible that only a small percentage of the data packets will be intended for a given station. In those embodiments that perform equalization training on each received data packet, it is highly beneficial for host station 350 to avoid training its receiver on packets not intended for that station. This requires that the receiver determine whether or not a packet is intended for host station 350 before the signal processing of payload data 2104 or header information 2103. A further discussion of packet recognition, timing synchronization and equalizer training is given later in this document (see Channel Estimation, Equalizer Training, and Header Processing).

In some embodiments, carrier sense and header detect 302 detects whether or not the data packet is destined for host station 350. In other embodiments the determination of destination is left to off-line processor 351. For discussion purposes, the data packet destined for station 350 is assumed to be data packet 404. Methods of determining whether or not the data packet is destined for host station 350 include: reading a destination from a header of the data packet; determining the destination from the timing of the data packet transmission relative to other data packet transmissions; determining the destination by application of a recognition procedure to the data packet or a header of the data packet; or determining the destination from other information received from the transmitting host station. Application of a recognition procedure to the data packet or header involves deducing the destination from contents of the header or portions of the data packet.

A method where the media access process can convey sideband information, completely separate from the data packet, is described in copending U.S. Patent Application "A Packet-Switched Multiple-Access Network System With Distributed Fair Priority Queuing", Ser. No. 09/026,884 U.S., by John T. Holloway, Jason Trachewsky, and Henry Ptasinski, assigned to the assignee of this application, herein incorporated by reference in its entirety. This sideband information can be used to identify the source and destination of the packet in much the same way as an analogous header tag or packet destination field.

Further methods of recovering the destination of a data packet include: recognizing the packet modulation profile, destination, and source based on pattern matching by well-known pattern matching algorithms (such as VQ) of a fixed signal preamble unique to the destination using a codebook of precalculated sample data patterns, where the codebook is optimized using a clustering/training algorithm that builds a balanced tree binary codebook; using a CDMA overlay superimposed in the same frequency band and on top of the modulation of the payload data to create a subchannel for communicating path identification and other header information, such that this subchannel resembles background noise to the main payload channel; and conveying header information in a frequency division sub-channel separate from what is used for payload data, such as one or more carriers of a multi-carrier modulation.

In one embodiment, a unique or hash value tag is assigned to a particular destination by a link-level network protocol. That tag, which is shorter than would be required if the destination field itself were coded and modulated into the header, is modulated into the header of the received packet. The hash value tag is then demodulated from the header and compared with the assigned tags of the receiving station. Alternatively, the tag field of the header is not demodulated and is compared against the receiver station's assigned tags by convolving the station's tag with an estimation of the channel and comparing that with the received symbols in the header. This latter method involves less computation than would be required to equalize the channel (i.e., remove the effects of channel distortion) and demodulate the destination codes. Using these methods, the destination codes need not be coded and modulated into the header in the format of the payload data.

This latter methodology exploits the fact that host station 350 does not need to decode the destination address of the data packet: It merely needs to determine whether the destination address of the data packet matches one of the address of interest to host station 350. If the address doesn't match, the packet can be discarded without further processing. Host station 350 does not need to determine the actual destination address.

The method consists of two steps. First, a channel estimate is constructed from a training sequence in the preamble of the received signal. Although a channel estimate may have previously been determined for the channel, determining a channel estimate on every incoming data packet sensitizes host station 350 to different channel distortions over different paths. A discussion of estimating channels is given in a separate section, Channel Estimation, Equalizer Training and Header Processing. In the second step, for each destination address of interest to host station, the channel estimate is convolved with the encoded destination address and the result is compared to the appropriate portion of the received data packet. If the difference between the result and the received data packet is below a threshold value then a match has occurred. If there is no match, then the data packet can be ignored and discarded. The process of convolving the channel estimate with the destination address of interest involves only additions, making the process especially suitable for efficient hardware implementation. In most embodiments, however, the method is implemented in off-line processor 351.

In addition, for an appropriately designed training sequence, the process of constructing a channel estimate requires no multiplication operations, only addition operations. If a match occurs between a destination address of interest and the data packet, the channel estimate may be further used to determine equalizer parameters, thereby training the equalizers.

Recognition of data packets destined for station 350 before further processing occurs is the preferred operation of network interface 300. However, in some embodiments network interface 300 can receive and hold for further processing all data packets on the physical medium. These alternative embodiments require more buffer memory storage than would otherwise be required. The preferred embodiment of network interface 300 receives all data packets on shared medium 400 but applies further processing only to those that are destined for station 350.

One method of determining the destination of data packet 404 is by examining a destination address field present in a header of data packet 404. The destination address field is optionally modulated in a format different from the modulation used in the payload of data packet 404 in order to simplify the complexity of carrier sense and header detect 302, as well as make the demodulation of the destination address field more error resistant than would be achieved with the data packet payload modulation alone. Such optional modulation may involve lower baud rates, lower spectral efficiency constellations, added coding, or different modulation methods such as QPSK, quadrature-amplitude modulation, spread-spectrum or multi-carrier modulation. In some embodiments, on detection of data packet 404, which is destined for station 350, carrier sense and header detect 302 enables a gated RX CODEC 303 to sample and digitize data packet 404 and store the resulting sample stream as a sample packet in RX Queue 207. Other embodiments store data packets directly into gated RX QUEUE 303 and determine the packet destination off-line. Gated RX CODEC 303 converts from the continuous analog signals of data packet 404 to sampled and digitized representations of those signals in the sample packet. Gated RX CODEC 303 often includes a controlled gain amplifier and an analog to digital converter.

In some embodiments, gated RX CODEC 303 also provides some signal filtering and timing recovery functions. However, in the preferred embodiments these functions are shifted entirely to off-line processor 351. The sample packet, therefore, is in a format ranging from being a digitized form of the analog data packet to being nearly host station formatted data, depending on the extent of the signal processing actually undertaken by gated RX CODEC 303.

In the preferred embodiment, the sample packet from gated RX CODEC 303 is a sampled representation of the analog data packet 404. In other embodiments, data packet 404 may undergo some signal processing in forming the sample packet. The sample packet is input to RX Queue 207 which holds the sample packet, along with previously received sample packets, and sends the sample packets to a processor 351 in station 350 for further signal processing. Processor 351 in station 350 receives each of the received sample packets and performs the remaining required signal processing to retrieve a host formatted data bit stream. The host formatted data is the digitized and processed payload data contained in the data packet in a data format compatible with station 350.

Processor 351 may be one of several different types. Processor 351 may be a dedicated firmware or software processor implemented external to network interface 300, or may be implemented on the same integrated circuit chip as are other components of network interface 300. Processor 351 may be firmware or software implemented on microprocessors dedicated to the signal processing task or implemented on a shared processor that is part of host station 350. Off-line processor 351 may be a combination of firmware and software, each implemented as above and each performing portions of the required signal processing tasks. As such, the off-line signal processing performed by processor 351 to transmit and receive digital packets is provided by a combination of one or more of the following: software or firmware executing on a dedicated embedded processor, microprocessor, digital signal processor, or mediaprocessor; software or firmware executed on a shared embedded processor, microprocessor, digital signal processor, or mediaprocessor; and dedicated hardware performing application-specific signal processing. In the preferred embodiment, processor 351 is a shared processor that is part of host station 350.

Buffer TX Queue 208 receives from processor 351 of station 350 a transmit packet for transmission. The transmit packet has been processed by processor 351 in station 350 so that it preferably is in the same data format as the sample packet held in RX Queue 207, i.e., a digitized data packet. Alternatively, another data format may be used in the transmit packet. Buffer TX Queue 208 holds the transmit packet along with previously received transmit packets and sends them to a gated TX CODEC 305. Gated TX CODEC 305 typically includes controlled gain amplifiers and a digital to analog (D/A) converter. The output of gated TX CODEC 305 is a transmit data packet, having the same format as a data packet, which is input to hybrid 209 for transmission to shared medium 400.

RX QUEUE 207 and TX QUEUE 208 may be any combination of memory incorporated on the same integrated circuit chip as network interface 300, memory external to the integrated chip containing network interface 300, and a portion of the memory of station 351. An advantage to having buffer RX QUEUE 207 as part of the station memory is that the size of RX QUEUE 207 can be dynamically adjusted to allow for receipt of a larger number of data packets into network interface 300.

In the preferred embodiment, the buffer memory is partially composed by memory in the network interface and memory in host station 350. The memory in the network interface is large enough to store a sufficient portion of a sample packet that the maximum latency in transferring words of the sample packet to memory in host station 350 does not result in loss of sample packet data. The memory in host station 350 is large enough to buffer bursts of sample packets from multiple senders (other stations), where the burst length is determined by higher-level network layer protocols. For example, in Ethernet applications, a memory capacity sufficient to store 64 kilobytes of receive sample packets will usually be sufficient.

Collision detect 204 monitors shared medium 400 and detects whether some other station attempts transmission at the same time as station 350. Normally, collision detect 204 compares the analog signal being transmitted by network interface 300 to the signal being received by network interface 300 in order to detect the presence of other simultaneous transmission indicating a data collision. A collisionDetect (CD) signal is output from collision detect 204 indicating whether or not a data collision is detected. On some shared media 400, it is necessary to remove interference caused by an echo of the transmitted data packet so that false collisions are not detected. One method, the preferred method, for removing this echo includes computing an echo replica of the transmit data packet being processed and storing the replica in buffer TX Queue 208 along with the data samples to be transmitted. The replica stored in buffer TX Queue 208 is input to collision detect 204 through line 310 and subtracted from the signal received from shared medium 400 that is also inputted by hybrid 209 to collision detect 204, obtaining a difference signal. The difference signal, which represents the energy transmitted from a second station, is compared to a threshold level to detect a data collision. A second method of canceling echo is to hold the header of packet 404 constant for all data packets. An echo replica is computed once, or in an alternate embodiment synchronously sampled from shared medium 400 during a prior transmission, and stored in collision detect 204. Energy transmitted from a second station is detected by subtracting this echo replica from a corresponding portion of the data packet.

MAC controller 206 receives signal CS from carrier sense/header filter 302 and signal CD from collision detect 204 and controls the timing of transmitting data to shared medium 400 by controlling the throughput of gated TX CODEC 305. When a data collision is detected by collision detect 204 or a data packet is sensed by carrier sense/header detect 302, MAC controller 206 prevents gated TX CODEC 305 from processing data packets from TX Queue 208. Hybrid 209, therefore, is prevented from transmitting data onto shared medium 400.

Figure 5:
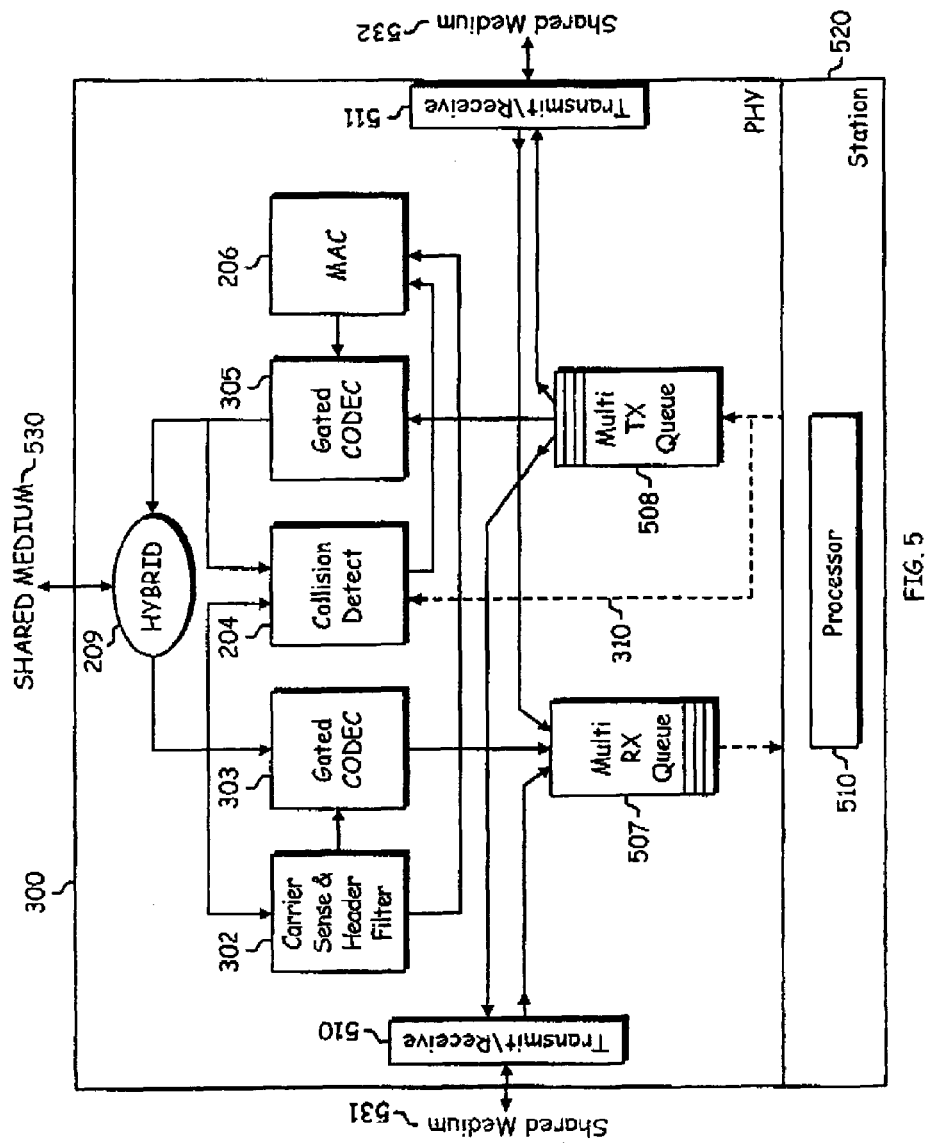
FIG. 5 shows an alternative embodiment of the invention having multiple sets of receiver and transmitter units.

FIG. 5 shows an embodiment of the invention capable of connecting to several shared media such as a local and a wide area network shared medium or of using different frequency bands on the same shared medium. In FIG. 5, network interface components hybrid 209, gated RX CODEC 303, carrier sense/header filter 302, gated TX CODEC 305, MAC 206, and collision detect 204 are instantiated in multiple copies. Each of the multiple copies is connected to a different shared medium 530 or use different frequencies on the same shared medium 530. In FIG. 5, the multiple copies include a transmit/receive 510 and a transmit/receive 511 that are connected to shared media 531 and 532, respectively. In general, any number of transmit/receive multiple copies are possible. A Multi-RX Queue receives sample packets from all of the multiple copies (including transmit receive 510 and 511 as well as gated CODEC 303), stores them, and transmits them to the host processor 510 of station 520. A Multi-TX Queue 508 holds transmit packets destined for all of shared media 530, 531, and 532 and transmits the transmit packets to the corresponding a gated TX CODEC (gated CODEC 305 or its counterpart in transmit/receive 510 or 511). The transmit packet and the sample packets are interleaved in the queues, each of the transmit packets and received packets having an identifier that identifies which shared medium 530, 531, or 532 that the packet is associated with.

Figure 6:
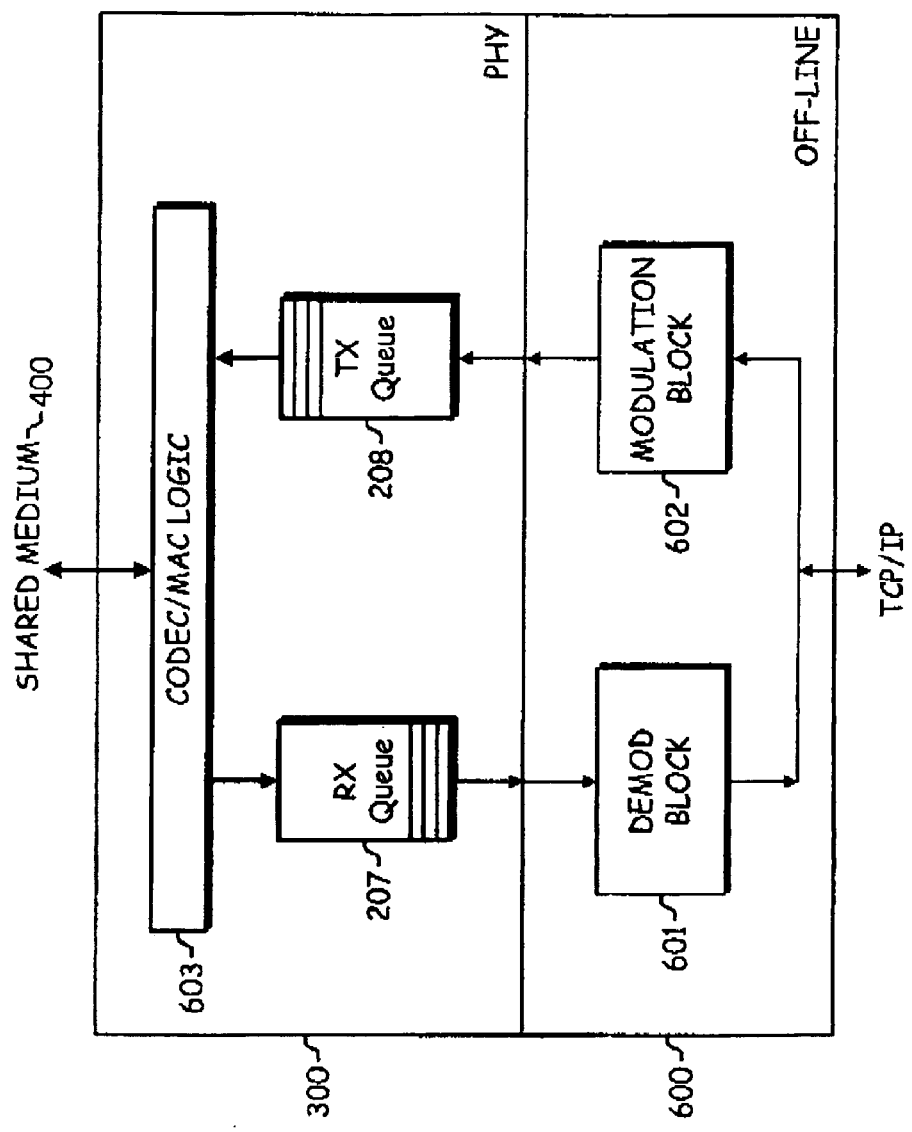
FIG. 6 shows off-line signal processing performed as part of a protocol stack.

FIG. 6 shows the off-line signal processing. In FIG. 6, a CODEC/MAC LOGIC 603 represents carrier sense and header detect 302, gated CODEC-303, collision detect 204, gated CODEC 305, MAC controller 206 and hybrid 209 from FIG. 3. Packets in sample form at physical layer 300 are stored in RX Queue 207 and TX Queue 208 in off-line processor 600. RX Queue 207 transmits sample packets to DEMOD 601 in off-line processor 600. Modulation 602 also transmits transmit packets to TX Queue 208. Off-line processor 600, corresponding to processor 351 of FIG. 3 or processor 510 of FIG. 5, can be implemented in hardware, in software, or in a combination of hardware and software, as was previously discussed.

Off-line processor 600 includes a DEMOD 601 that receives sample packets from RX QUEUE 207 of PHY layer 300 and a MOD 602 that sends transmit packets to TX QUEUE 208 of PHY layer 300. RX Queue 207 alerts DEMOD 601 of the presence of sample packets to be processed and DEMOD 601 processes the received sample packets stored in RX QUEUE 207. DEMOD 601 completes the signal processing of the sample packet that has not already been accomplished and that sample packet is removed from RX QUEUE 207. When DEMOD 601 has processed the sample packet, the processed packet, now in host data format, is transmitted to a higher level network protocol layer such as TCP/IP. RX QUEUE 207 and TX QUEUE 208 may be partially implemented in PHY layer 300 and also in off-line processor 600, as previously discussed.

The signal processing rate required of DEMOD 601 or MOD 602 need not be that of receiving data packets and storing sample packets in RX Queue 207. For example, in FIG. 4, data packet 405 is being received into RX Queue 207 before all of data packet 404 is processed (see processor time 407). Sufficient buffering is provided in RX QUEUE 207 to handle a series of data packets on shared medium 400 that are destined for station 350. The average rate of data packet transmission on shared medium 400 destined for station 350 is controlled by higher-level network protocols such as TCP and is a rate below the maximum throughput of DEMOD 601. DEMOD 601 should be capable of processing at a rate sufficient to achieve the throughput required of the network application in host station 350, which may be much lower than the transmission rate on shared medium 400.

MOD 602 receives transmit data from the higher level network protocol layers, e.g. TCP/IP, encodes the host data, and processes it into transmit packets. In some embodiments, encoding the host data involves preprocessing the data packet consistently with known channel characteristics between the host station and the receiving station. Such preprocessing may include bit mapping or trellis processing in order to mitigate the effects of channel distortion. Preprocessing functions, if used, are coordinated with the receiving station's receiving functions.

Figure 1:
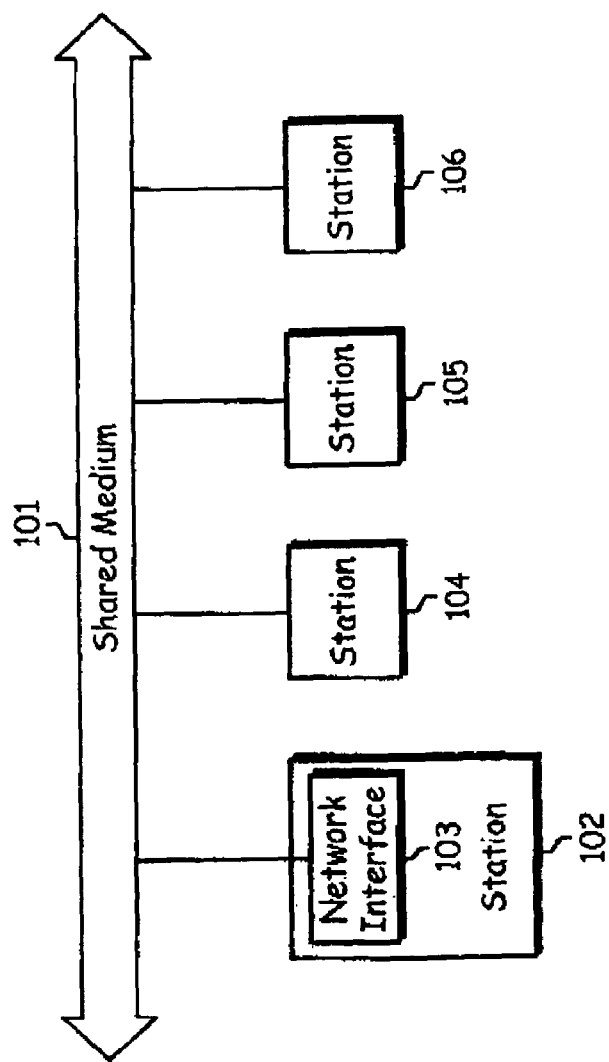
FIG. 1 shows a typical shared-medium network.
Figure 2:
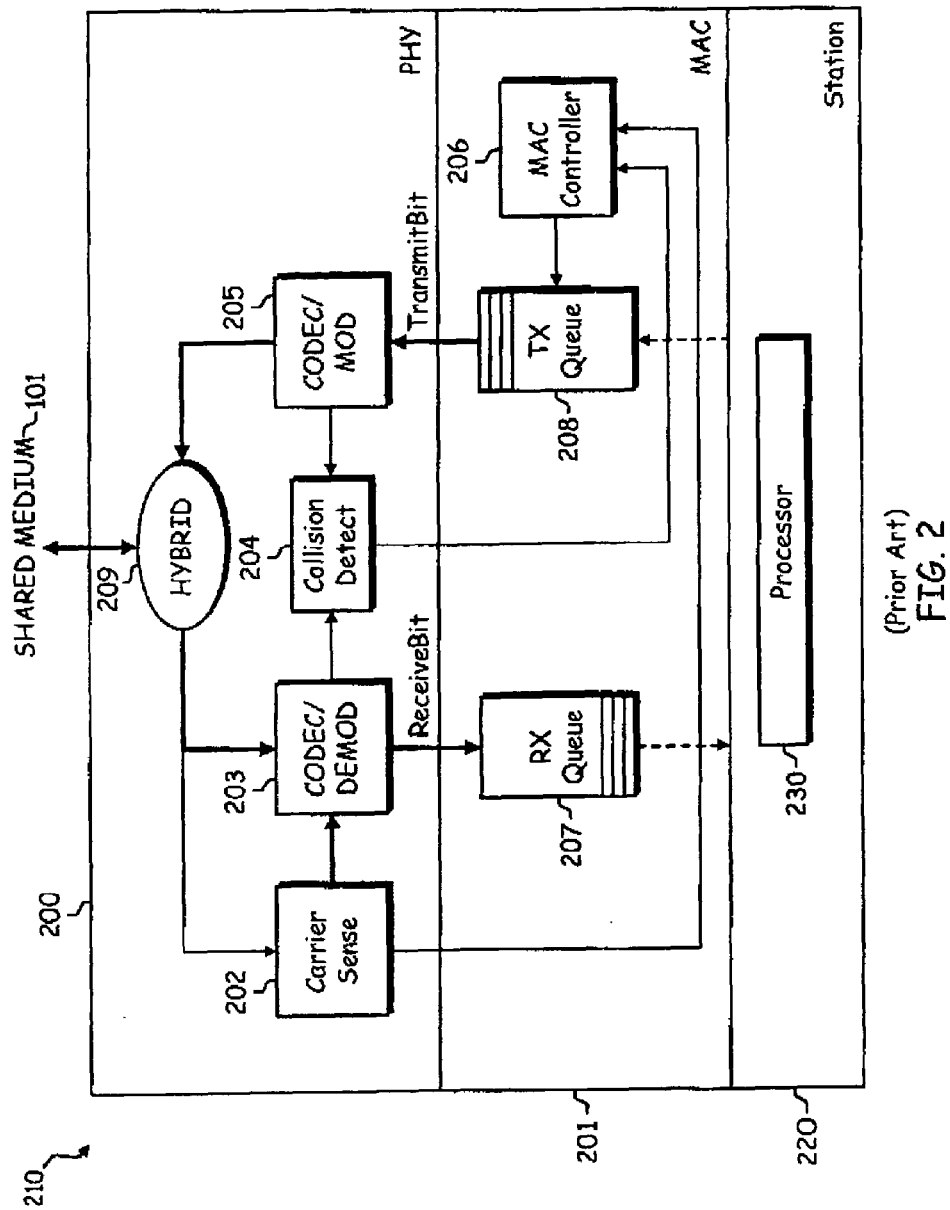
FIG. 2 shows a prior-art network interface to the shared medium network.

The transmit packets, after encoding, are then transmitted to TX Queue 208. TX Queue 208 signals MAC controller 206 (FIG. 2) in CODEC/MAC logic 603 that a transmit packet is ready. The transmit packet, under the control of MAC controller 206, is then transmitted through hybrid 209 to shared medium 400.

Figure 7:
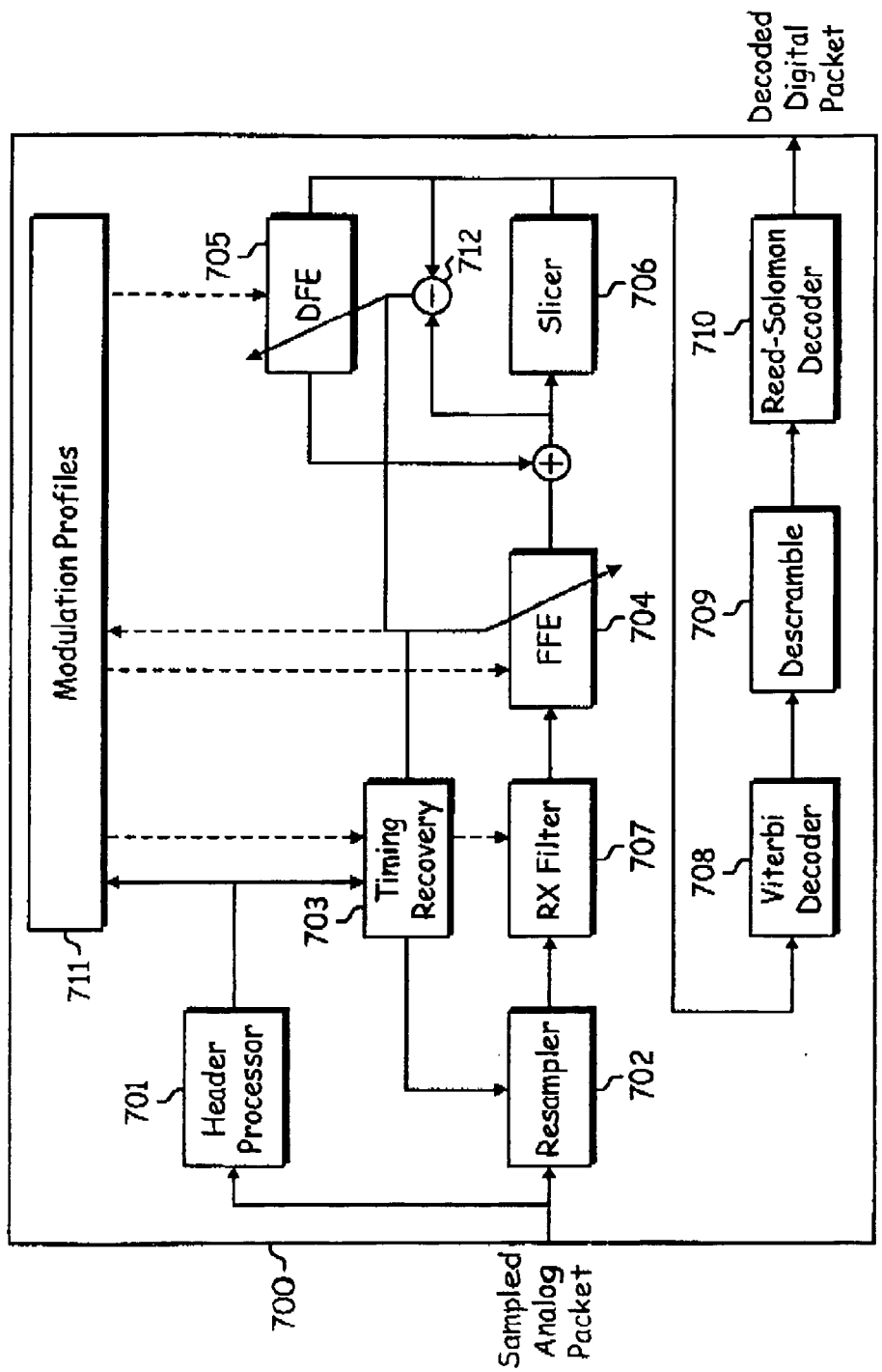
FIG. 7 shows an embodiment of a DEMOD according to the current invention.

FIG. 7 illustrates an embodiment of DEMOD 601. Although the same functions can be performed partially or completely by a hardware implementation, in the preferred embodiment DEMOD 601 is implemented in software utilizing the computing resources of station 350.

Sample packets from RX QUEUE 207 are received by a header processor 701 and a resampler 702. Header processor 701 uses signals in a header prepended to data packet 404 that identify the source station and intervening channel characteristics. These signals are used as an index into a modulation profile table 711. In an alternative embodiment, header processor 701 uses signals in the header to calculate a set of parameters including a channel estimate, a set of equalizer coefficients and a timing phase and frequency estimate. This set of parameters is then used to control DEMOD 700 functions and additionally may be stored into a modulation profile table 711 for future use.

The data in modulation profile table 711 or the direct output of header processor 701 provides parameters to control several functions of DEMOD 700 and are inputted to a timing recovery 703 and an equalizer (FFE 704, DFE 705 and slicer 706). In DEMOD 700, the equalizer is a decision feedback equalizer with adaptively chosen parameters comprising a feed-forward section FFE 704 and a feed-back section DFE 705. Signals in the header are also used to provide an initial baud phase timing estimate which is input to timing recovery 703. Timing recovery 703 controls resampler 702 which corrects for offset between the sample rate of gated RX CODEC 303 of physical layer 300 and the actual baud rate and phase of data packet 404.

In an alternative embodiment, the equalizer coefficients computed by header processor 701 are made such that the function of adjustment for baud phase offset of resampler 702 and the function of receive filter 707 are accomplished in the FFE 704.

After the sample packet data passes through resampler 702, it enters RX filter 707. RX filter 707 conditions the receive packet data by including matched filters (for limiting the frequency range of sampled signals and shaping modulation pulses) and a gain control multiplier for correcting any flat loss of signal through the channel of shared medium 400.

In the preferred embodiment shown in FIG. 7, correction for intersymbol interference, a result of dispersion in the channel, is accomplished by a decision feedback equalizer comprising feed-forward equalizer 704 and feed-back equalizer (DFE) 705. In other embodiments, equalization may be accomplished by alternative methods including a decision feed-back equalizer having no feed-forward section or a linear equalizer having no feed-back section. The parameters of feed-forward equalizer 704 and feed-back equalizer 705 are adaptively chosen in adapter 712 in order that the removal of intersymbol interference by the equalizer is optimized. The equalizer outputs a corrected data signal.

The corrected data signal is input to slicer 706 which determines the decoded data symbol value based on the corrected data signal. Adapter 712 inputs the corrected data signal from the equalizer and the decoded data symbol from slicer 706 and adjusts the parameters of FFE 704 and DFE 705 to optimize the functioning of the equalizer. The parameters of FFE 704 and DFE 705 include multiplier coefficients of implemented transfer functions used to model channel distortion within shared medium 400. In some embodiments, the adapted parameters for FFE 704 and DFE 705 are stored back into the table of modulation profiles 711, to provide for adaptation across successive packet transmissions, and may be supplied to timing recovery 703.

In the preferred embodiment, the decoded data symbols are further processed by a Viterbi decoder 708, a descrambler 709, and a Reed-Solomon decoder 710. Viterbi decoder 708 uses a well-known algorithm to perform maximum likelihood sequence estimation on the received signal using soft-decision outputs from slicer 706. Descrambler 709 reverses the effect of a corresponding scrambler used in the transmit modulator to whiten the spectrum of the transmit data signal. Reed-Solomon decoder 710 uses well-known algorithms to perform error correction using redundant block codes. In the preferred embodiment, Viterbi decoder 708 and Reed-Solomon decoder 710 are optional, and may be used in the signal processing chain only when the demodulated data appears to be received in error because the data throughput of demodulator 700 may be higher without these functions. In some cases, optional use of Viterbi decoder 708 may restrict the use of decision feedback equalizer 705. In the preferred embodiment, the signal processing chain employed can be specialized to each sampled analog packet based on information decoded from the header as previously described. These decoder and filtering functions provide further decoding and error correction to improve the effective bit-error rate of the receiver function. The decoded digital packet is then passed up to higher-level network protocol layers.

Figure 8:
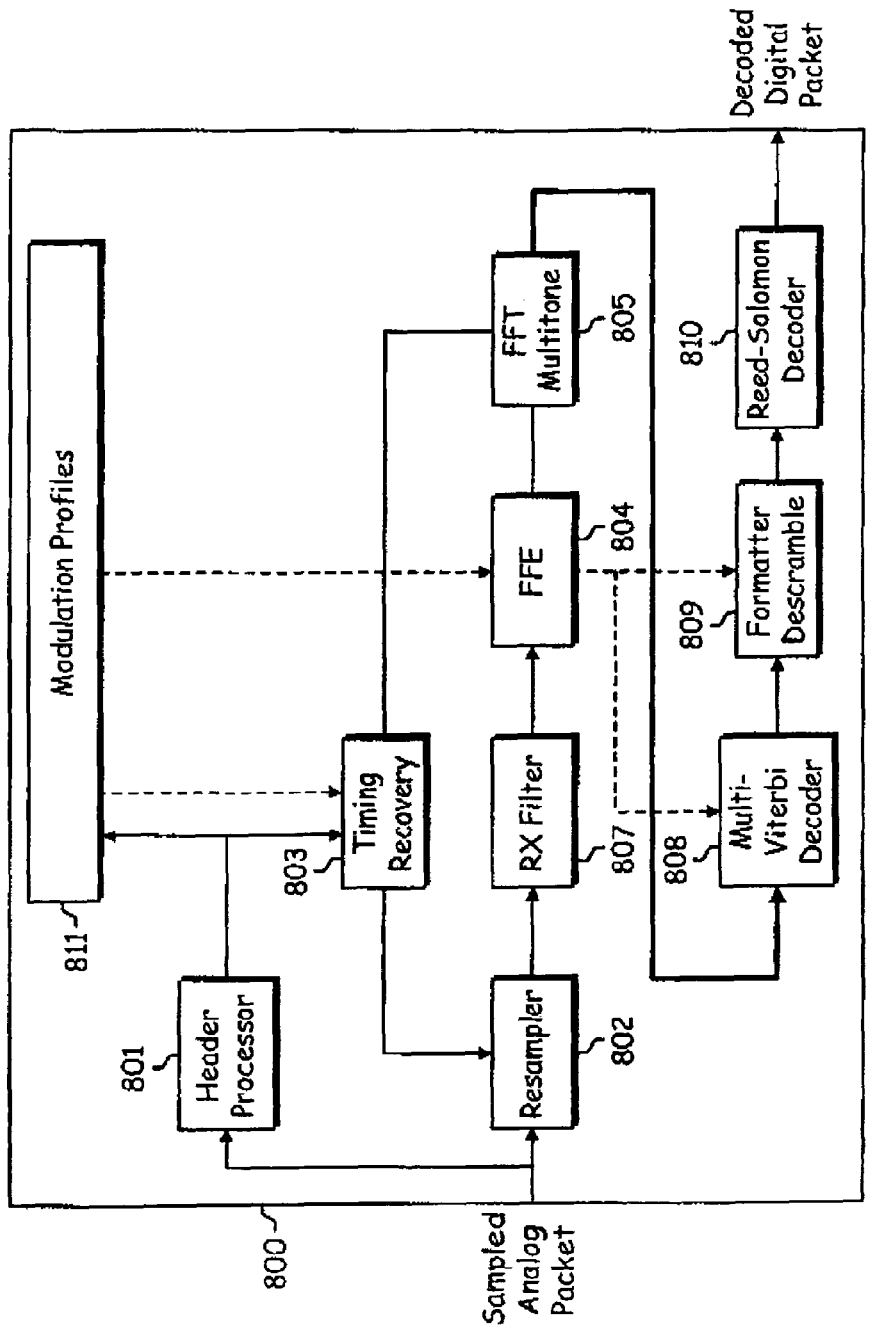
FIG. 8 shows another embodiment of a DEMOD for use with a system having multiple carrier frequencies.

FIG. 8 illustrates an alternative embodiment of DEMOD 601 where multi-carrier modulation is used. Sample packets from RX QUEUE 207 are received by header processor 801 and resampler 802, where the packet header is used to locate a modulation profile stored in modulation profiles 811. Modulation profile 811 stores parameters needed by timing recovery 803, FFE 804, multi-Viterbi decoder 808 and formatter/descrambler 809. After timing recovery 803, RX filter 807 and linear equalizer 804, a block of time domain samples are transformed by fast fourier transform FFT 805 into a block of frequency domain samples representing phases and amplitudes for multiple carriers. Each carrier is further demodulated by a set of Viterbi decoders 808, one for each carrier. The resulting set of bit values, which may vary in numbers of bits across the set of carriers, are reformatted and descrambled by formatter/descrambler 809. The gains and constellation depth for each individual carrier are described by the modulation profile stored in modulation profiles 811.

Figure 9:
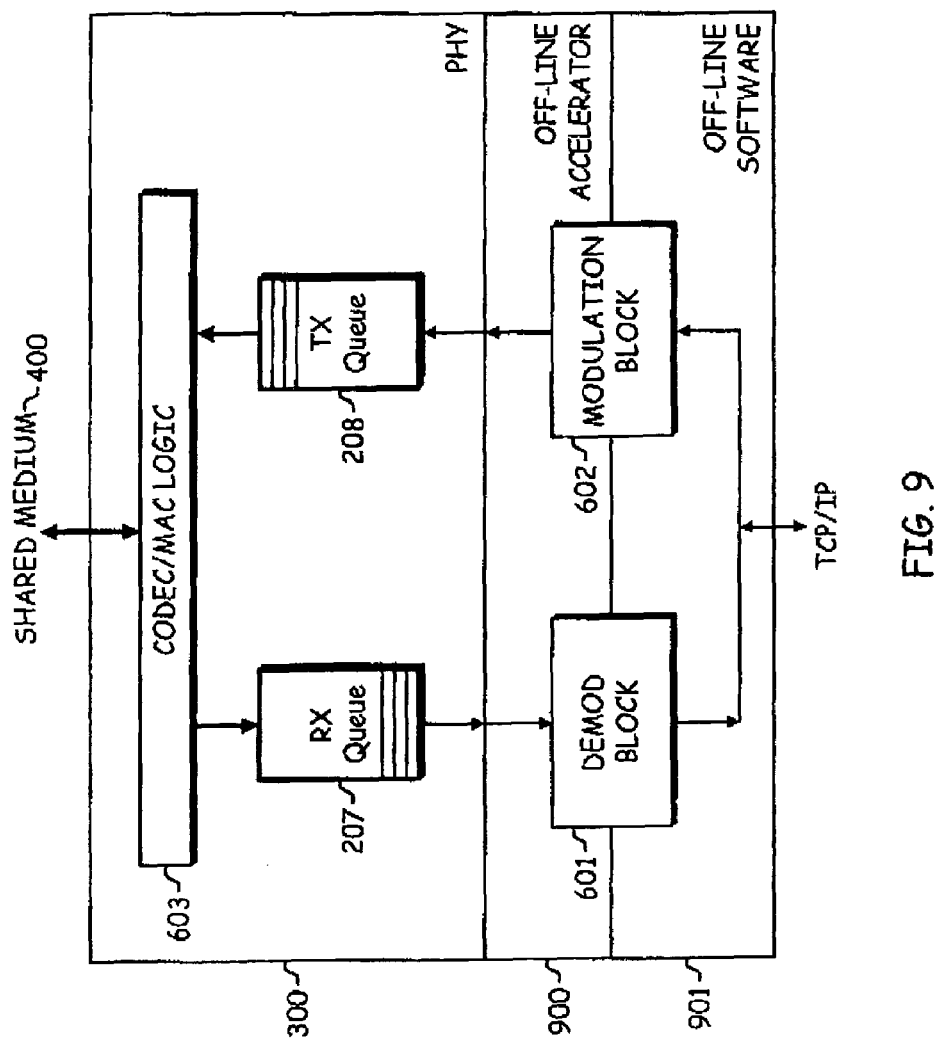
FIG. 9 shows partitioning of the off-line processing into a hardware accelerator coupled to software protocol processing.

An alternative embodiment of the invention is shown in FIG. 9. In FIG. 9, off-line processor 600 is partitioned into a hardware accelerator 900 and an off-line software 901. For example, certain processes such as those performed in FIG. 7 by resampler 702, RX filter 707, FFE 704 and DFE 705 often dominate the total computation but consist to a large degree of repetitive multiply-accumulate operations. These processes can be implemented in hardware accelerator 900, removing the load on a host processor that implements off-line software 901. The throughput of off-line processor 600 (FIG. 6), therefore, can be increased by this combination of hardware processing and software processing. Alternatively, all of the required off-line signal processing can be accomplished in hardware.

In another alternative embodiment, gated RX CODEC 303 (FIG. 3) comprises additional signal processing in order to implement digital signal filtering sufficient to reject spurious signals outside the frequency band for transmissions on shared medium 400. In yet another embodiment, gated CODEC 303 also comprises additional signal processing to resample between the clock rate of gated RX CODEC 303 and the actual baud rate of the data packet. This additional processing can reduce the size of sample packets that need to be stored in RX QUEUE 207. In these embodiments, the most time consuming portions of the required signal processing are accomplished in off-line processor 351.

In an additional embodiment, the processing of sample packets from RX queue 207 (FIGS. 2, 3, 6, and 9) is prioritized so that sample packets that are of higher priority than others are processed first.

In yet another embodiment, carrier sense and header detect 302 (FIG. 3) and collision detect 204 (FIG. 2) function to monitor shared medium 400 for the presence of noise which might interfere with transmission of a transmit packet. When noise is detected prior to transmission of a transmit packet, carrier sense and header detect 302 and collision detect 204 treat the noise as a data collision and direct MAC controller 206 to delay transmission of the transmit packet. Therefore, network interface 300 can recover and reschedule transmission of transmit packets on detection of significant noise on shared medium 400.

In some embodiments of the invention, when no data packets that are directed toward station 350 are present on shared medium 400 (as in period 402 of FIG. 4), no sample packets are stored in RX Queue 207 and no processing is invoked in processor 351.

Figure 10:
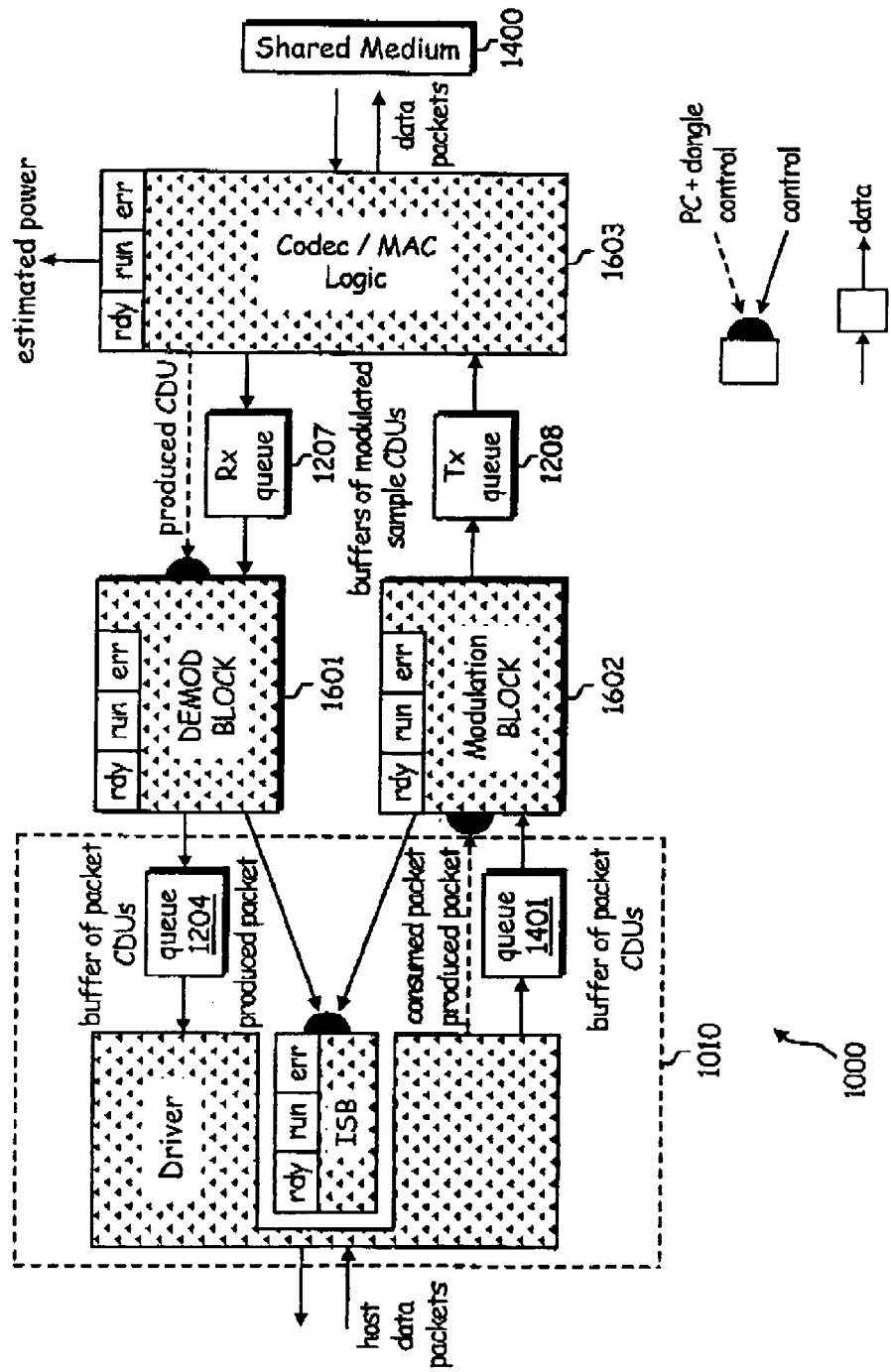
FIG. 10 shows a block diagram of an implementation of the preferred embodiment of the invention.

FIGS. 10 through 15 show block diagrams of an implementation of the preferred embodiment of this invention. A block diagram of network interface 1000 is shown in FIG. 10. In FIG. 10, CODEC/MAC Logic 1603 includes the hardware required to receive data packets from shared medium 1400 and transfer them to RX QUEUE 1207 as sample packets. In addition, CODEC/MAC logic 1603 receives transmit packets from TX QUEUE 1208 for transmission as data packets on shared medium 1400. DEMOD 1601 performs the necessary symbol processing functions required to receive data packets from shared medium 1400 and MOD 1602 performs the necessary symbol processing functions required to transmit data packets over shared medium 1400. An interface 1010 represents the incidental interface logic required for the host station to operate network interface 1000 and includes queues 1204 and 1401.

In this implementation, DEMOD 1601 and MOD 1602 are implemented in software code operating on the host station. This software code is shown in Microfiche Appendix A. RX QUEUE 1207 and TX QUEUE 1208 are implemented in the memory of the host station. The hardware board implementing CODEC/MAC logic 1603 is shown in Microfiche Appendix B.

Figure 11:
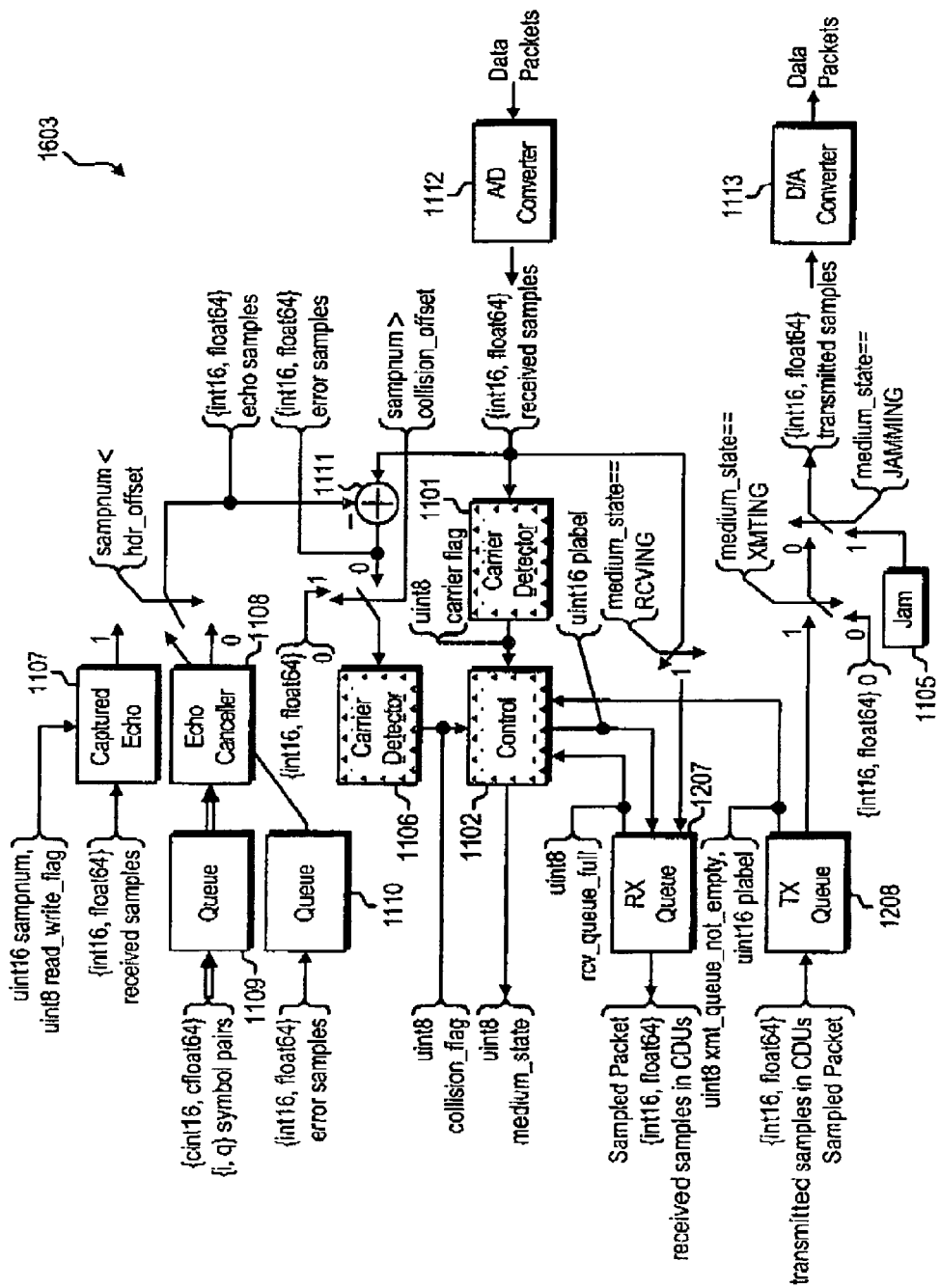
FIG. 11 shows a block diagram of the CODEC/MAC logic shown in FIG. 10.

FIG. 11 shows a block diagram of CODEC/MAC logic 1603. Circuit diagrams for the hardware board implementing CODEC/MAC logic is included in Microfiche Appendix B. In receive mode, data packets are received into A/D converter 1112. The presence of the digitized data packet is detected by a carrier detector 1101. Carrier detector 1101 alerts control 1102 and the digitized data packet is routed to RX QUEUE 1207. In transmit mode, sample packets are received into TX QUEUE 1208 and, in response to signals from control 1102, sent to A/D converter 1113 and then to shared medium 400. Collision detection is accomplished with echo canceller 1108 and carrier detector 1106 that outputs signals to control 1102. Queue 1109 and queue 1110 hold control parameters for echo canceller 1108. Adder 1111 subtracts the echo generated in echo canceller 1108 from the digitized data packets. Carrier detector 1106 monitors the output of adder 1111 and detects the presence of a transmission from another station. As was discussed above, the presence of this transmission delays any transmission from CODEC/MAC 1603.

Figure 12:
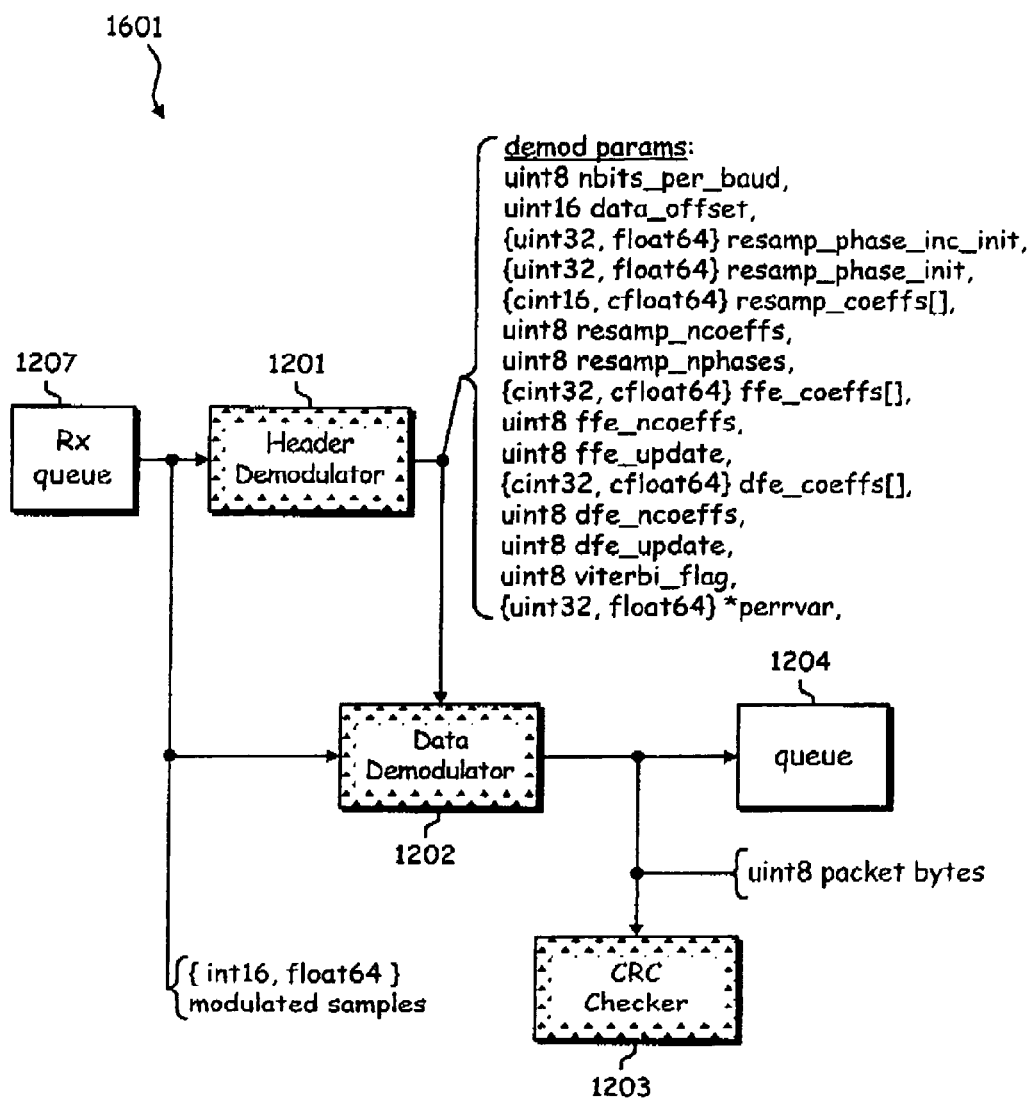
FIG. 12 shows a block diagram of the demodulation process shown in FIG. 10.

FIG. 12 shows a block diagram of the DEMOD 1601. Sample packets from RX QUEUE 1207 are received into header demodulator 1201 and into data demodulator 1202. Header demodulator 1201 demodulates the header of the sample packet in order to determine the demodulation parameters. Data demodulator 1202 performs the symbol processing required to convert the sample packets into host data packet format. Header demodulator 1201 also determines that the received data packet is destined for the host station. The data in host data packet format is sent to queue 1204 that is part of interface 1010 (FIG. 10). CRC checker 1203 also receives the host data packets.

Figure 13:
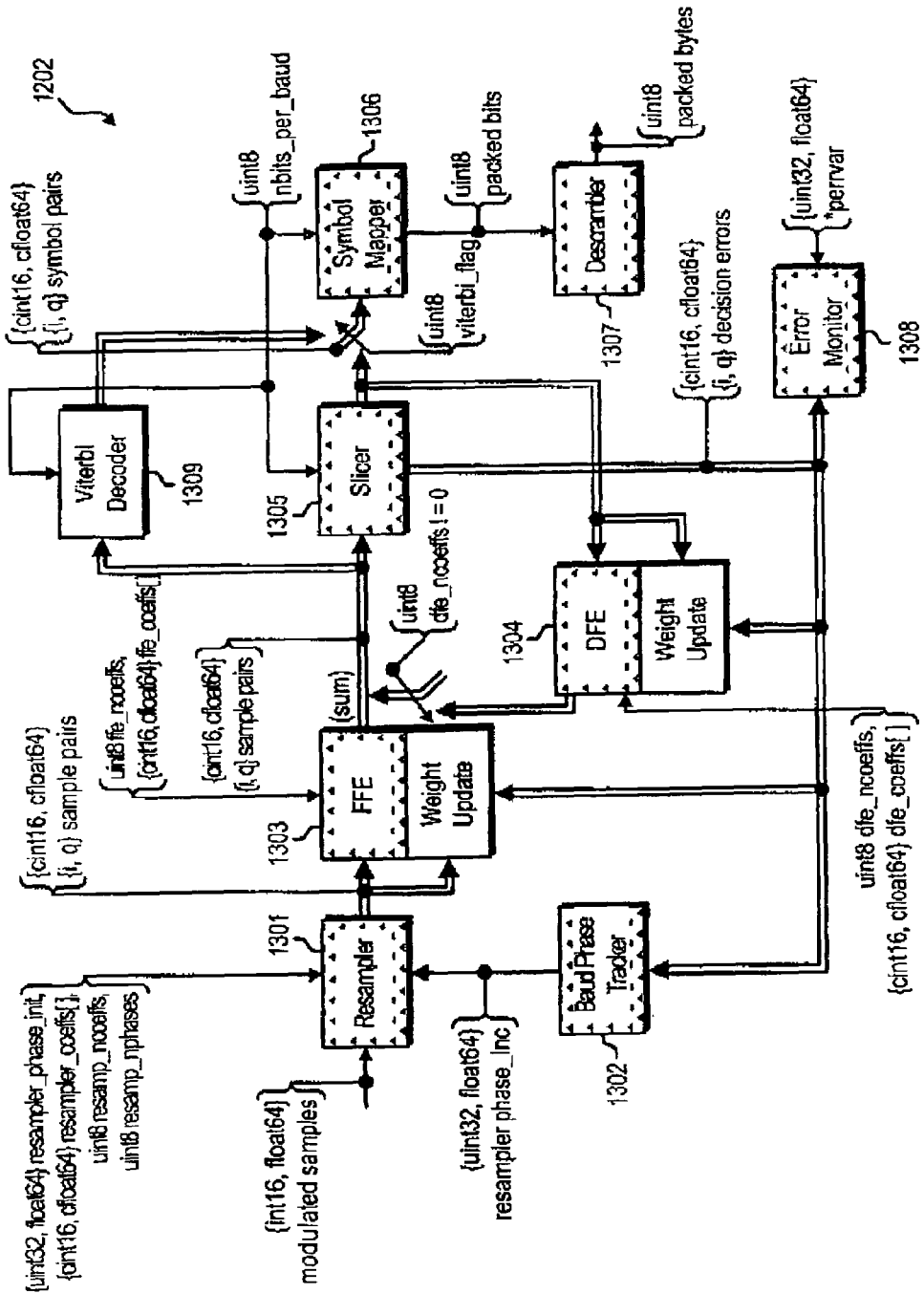
FIG. 13 shows a block diagram of the data modulation process shown in FIG. 12.

FIG. 13 shows the preferred implementation of data demodulator 1202, which is similar to the data demodulators shown in FIGS. 7 and 8. Data demodulator 1202 includes resampler 1301, a feed-forward equalizer 1303, a decision feedback equalizer 1304, slicer 1305, Viterbi decoder 1309, symbol mapper 1306 and descrambler 1307. Error monitor 1308 and baud phase tracker 1302 provide output monitoring and input to resampler 1301. Parameters controlling the demodulation process (shown stored in modulation profiles 711 and 811 in FIGS. 7 and 8) are shown as inputs to the various functions of the block diagram in FIG. 13. Use of DFE 1304 and Viterbi decoder 1309 in processing symbols is optional in this implementation.

Figure 14:
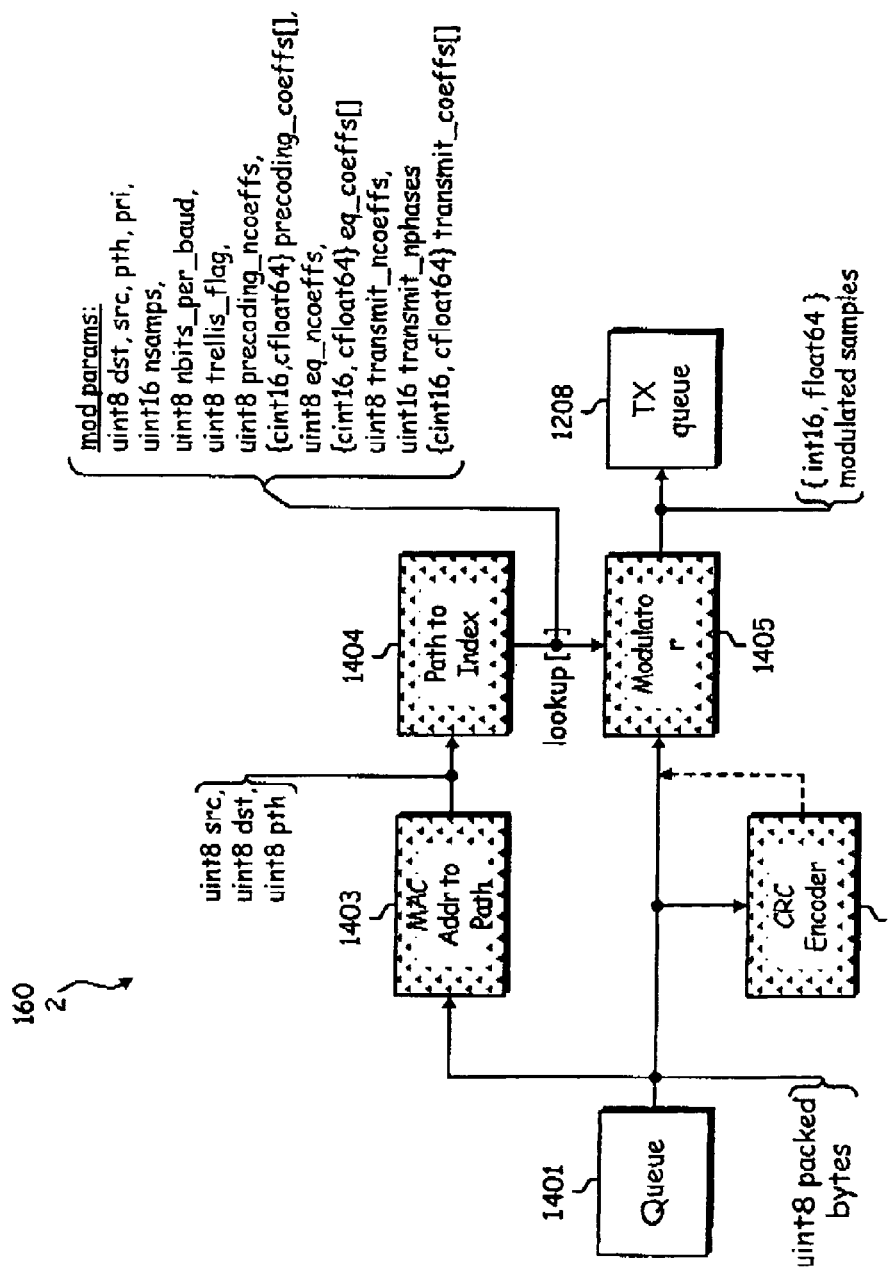
FIG. 14 shows a block diagram of the modulation processing shown in FIG. 10.

FIG. 14 shows a block diagram of MOD 1602 (FIG. 10). Data in host packet format is buffered in queue 1401 that is part of interface 1010. Modulator 1405 converts the host data into sample packet format and transmits the sample packet to TX QUEUE 1208. MAC ADDR 1403 and path 1404 supply modulator 1405 with appropriate parameters to modulate the host data packet in response to the host data packet itself. These parameters include parameters describing the transmission channel between the host station and a receiving station.

Figure 15:
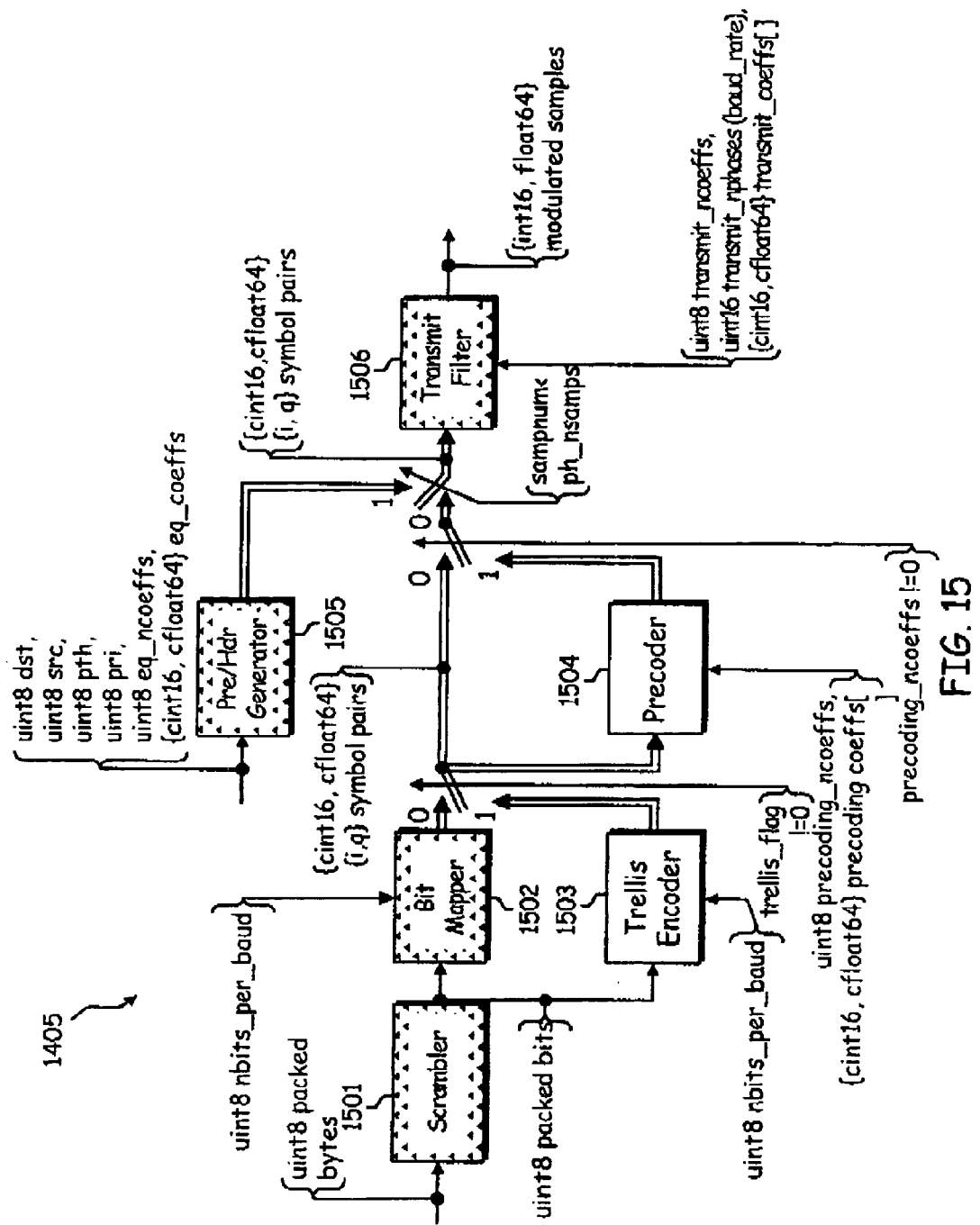
FIG. 15 shows a block diagram of the modulator shown in FIG. 14.

FIG. 15 shows a block diagram of modulator 1405. Modulator 1405 includes a scrambler 1501, a bit mapper 1502, a trellis encoder 1503, a precoder 1504, a transmit filter 1506, and a header generator 1505. Precoder 1504 is optional and the host data is either processed through bit mapper 1502 or trellis encoder 1503 depending on parameters input to modulator 1405 from path 1404.

Channel Estimation, Equalizer Training, and
Header Processing

Many embodiments of this invention will be used with local area networks having multiple stations connected over preexisting twisted pair telephone wiring in a residence or small business. Unlike existing LAN equipment, which requires the use of conditioned wiring to prevent distortion of the signals, these applications often use unconditioned wiring that can result in severe distortion of data packets. In order to decode the data packets, the distortion must be corrected by equalization of the data packet signal. The nature of the channel distortion will generally be different for each pair of stations on the network, so the equalization parameters will be different for each path on the network.

The stations communicate by sending short data packets. In most embodiments, each data packet 2100 comprises a header 2101 followed by a payload data 2104, as is shown in FIG. 21. Header 2101 indicates the source and destination of the packet and possibly some other information used by the interface system. Header 2101 also enables timing synchronization for decoding payload data 2104. Payload data 2104 contains the data used by the higher OSI layers (See R. L. Freeman, Telecommunications Systems Engineering, Third Edition (1996). In many embodiments, payload data 2104 is modulated according to a pre-negotiated modulation scheme, however payload data modulation information may also be included in header 2101.

In most embodiments, before two stations exchange data they perform an initial training routine to characterize the channel distortion, train their equalizers by determining the parameters to be used in the equalizers (see FIGS. 8 and 9), and negotiate modulation parameters to maximize throughput efficiency. This training procedure is performed only at start-up time or when the line conditions change. Once training is complete, the stations may exchange an unlimited number of packets. Some embodiments train the equalizer on receipt of each data packet.

Multiple access control (MAC) protocol regulates access to the network. Only one station may transmit at a time with the MAC determining which station is transmitting at any given time. In most embodiments, MAC does not provide any information to assist in determining the source or destination of the packet. The source and destination can be determined only by examination of the received signal.

A primary problem is that when a signal is detected on shared medium 400 (FIG. 3), neither the source nor the intended destination is known to host station 350. The source and destination are encoded in header 2102, but header 2102 cannot be decoded without equalization and equalization requires prior knowledge of the source and destination (so that the predetermined channel characteristics can be used). Another consideration is that the header decoding algorithm must have relatively low computational complexity so that the cost is minimum if destination detection is implemented in the hardware or there is low computational cost if header detection is implemented in off-line processor 351. This precludes performing the more sophisticated analysis carried out on payload data 2104. Another consideration is that header 2101 should be as short as possible to minimize the overhead associated with data packet throughput on shared medium 400.

Figure 16:
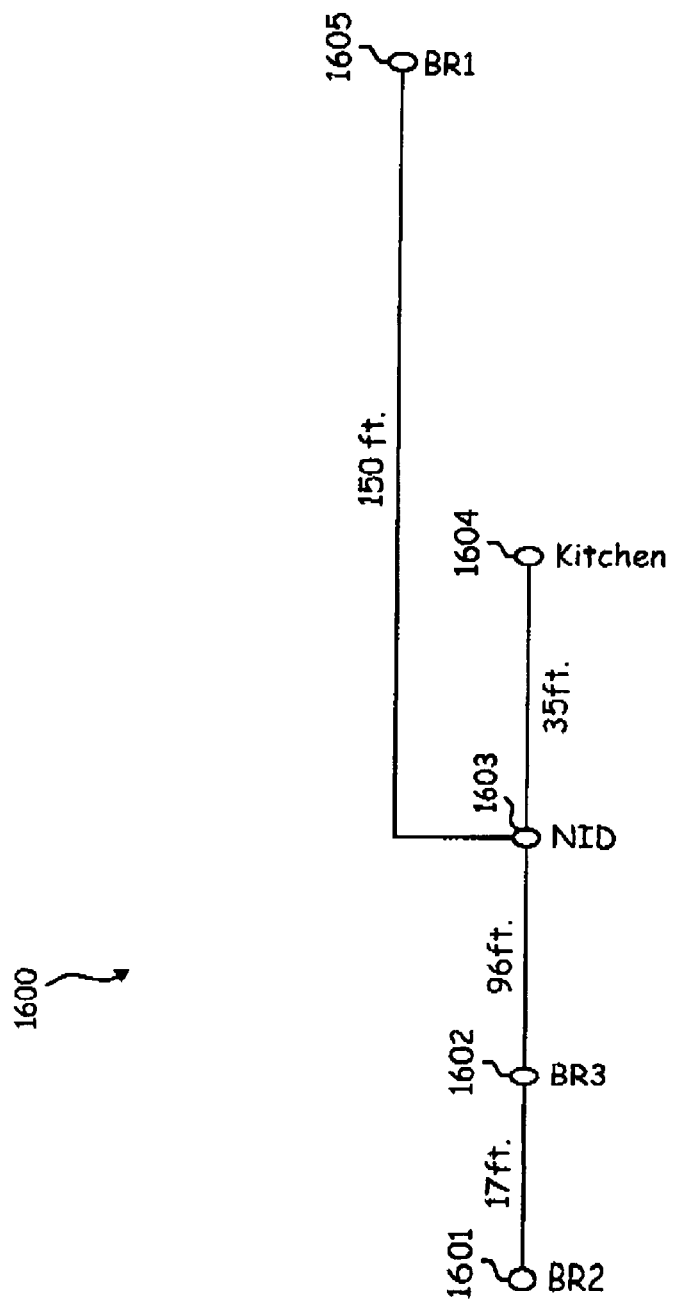
FIG. 16 shows a typical home network.
Figure 17A:
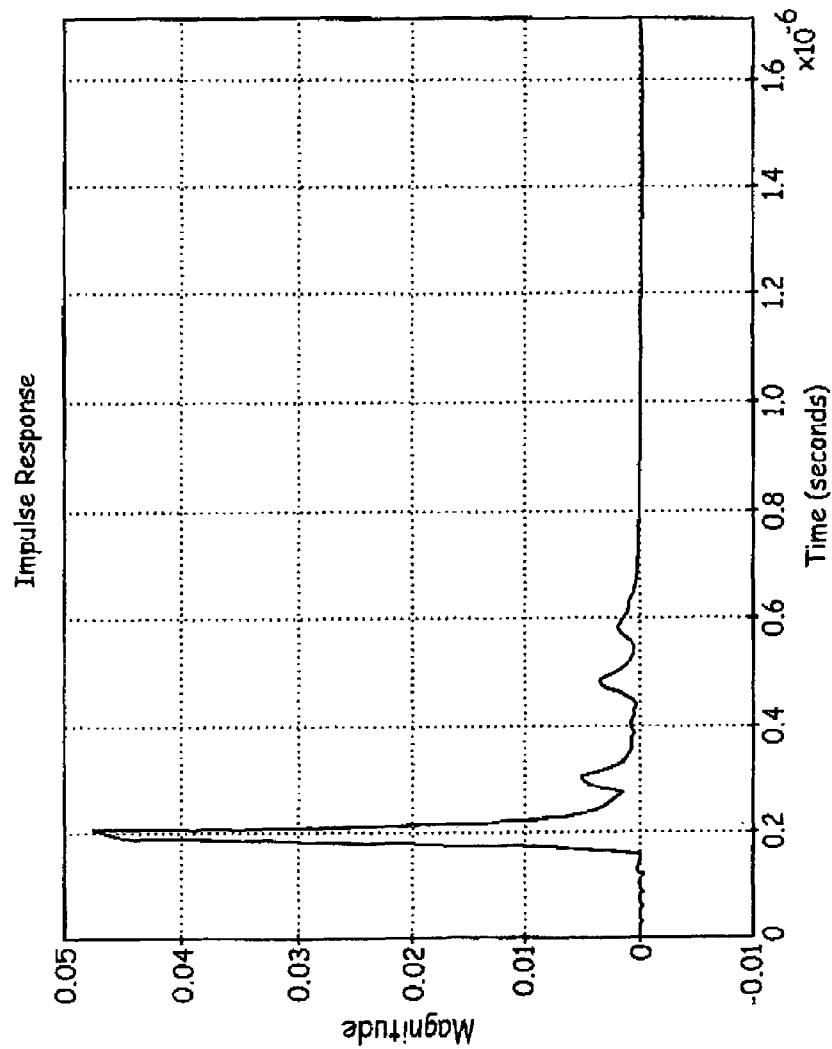
FIG. 17A shows the impulse response of the network shown in FIG. 16 when all of the terminal jacks of the network are properly terminated.
Figure 17B:
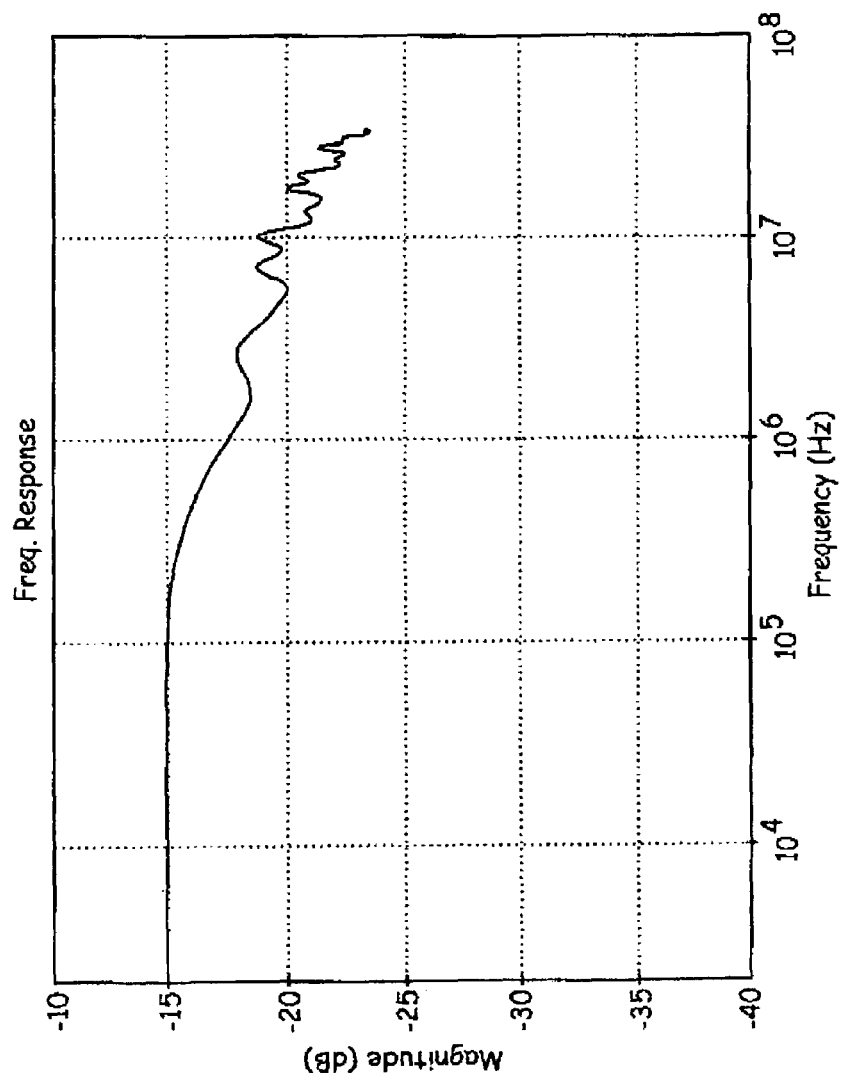
FIG. 17B shows the frequency response of the network shown in FIG. 16 when all of the terminal jacks of the network are properly terminated.

The primary source of channel distortion is incorrectly terminated lines in shared medium 400. An incorrectly terminated line will cause a reflection, introducing echoes in the impulse response and spectral nulls in the frequency response of the channel. FIG. 16 shows typical residential wiring used as shared medium 1600. In FIG. 16, shared medium 1600 forms a network having lines terminating at terminal jacks in bedroom2 1601, bedroom3 1602, den 1603, bedroom1 1605, and kitchen 1604. Stations such as host station 350 (FIG. 3) are connectable to each of the terminal jacks in shared medium 1600. In addition, stations are typically connected to several of the terminal jacks in shared medium 1600. FIG. 17A shows the impulse response between the terminal jacks of bedroom3 1602 and kitchen 1604 when the terminal jacks for bedroom2 1600, den 1603, and bedroom1 1605 are properly terminated with 100 ohm resistors. FIG. 17B shows the frequency response between bedroom3 1602 and kitchen 1604 when the terminal jacks for bedroom2 1600, den 1603, and bedroom1 1605 are properly terminated with 100 ohm resistors.

FIGS. 18A through 18F shows a 4-CAP (carrierless amplitude-phase modulation) constellation transmitted over the channel shown in FIGS. 17A and 17B. A QPSK constellation such as 4-CAP or 4-QAM (quadrature amplitude modulation) represents data being sent using four symbols of equal magnitude with a phase difference of 90 degrees between adjacent symbols. FIG. 18A shows the 4-CAP constellation at 0.14 Mbaud, FIG. 18B shows the 4-Cap constellation at 0.41 Mbaud, FIG. 18C shows the 4-Cap constellation at 0.68 Mbaud, FIG. 18D shows the 4-Cap constellation at 1.09 Mbaud, FIG. 18E shows the 4-Cap constellation at 4.35 Mbaud, and FIG. 18F shows the 4-Cap constellation at 8.70 Mbaud. Other constellations having a different symbol alphabet may also be used on shared medium 1600. In FIGS. 18A through 18F, the center frequency is assumed to be equal to 0.8 times the baud frequency. As can be seen from FIGS. 18A through 18F, the channel introduces some distortion (indicated by the spread of each of the symbols in the constellation), but error-free decoding of a 4-CAP constellation is still possible at every baud rate shown.

Figure 19A:
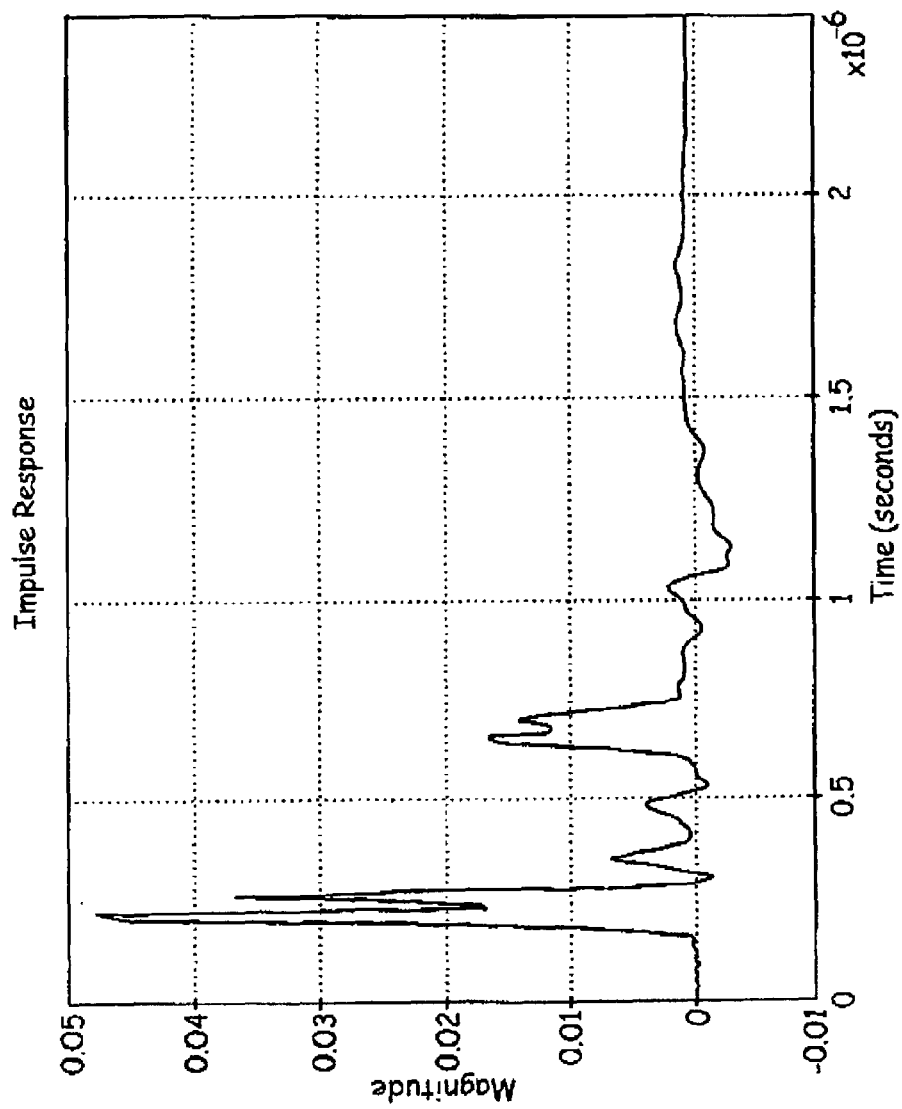
FIG. 19A shows the impulse response of the network shown in FIG. 16 when the terminal jacks of the network are not terminated.
Figure 19B:
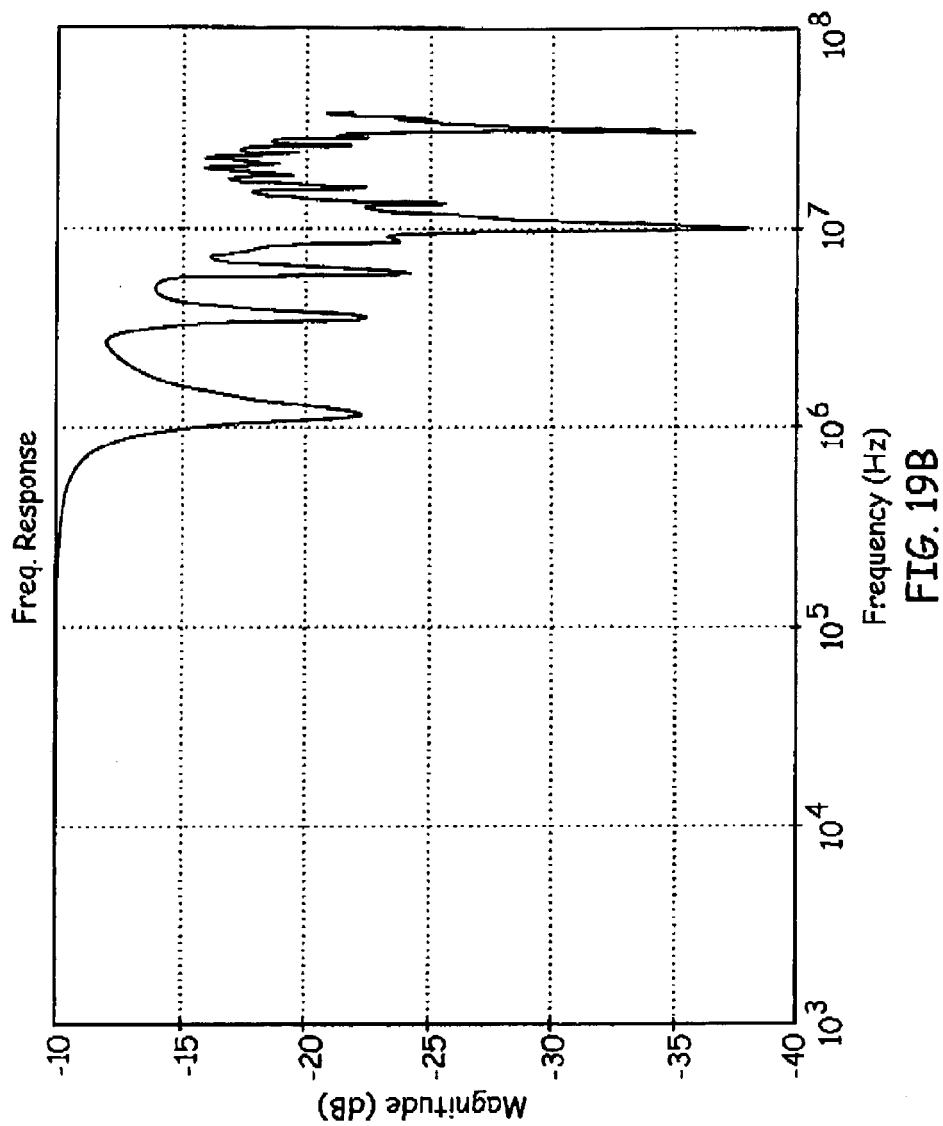
FIG. 19B shows the frequency response of the network shown in FIG. 16 when the terminal jacks of the network are not terminated.

Typically, however, several of the terminal jacks in the network will be unterminated or incorrectly terminated. FIGS. 19A and 19B show the impulse response and frequency response, respectively, between the terminal jacks of bedroom3 1602 and kitchen 1604 when the terminal jacks of bedroom2 1601, den 1603, and bedroom1 1605 are unterminated. The unterminated terminal jacks cause strong reflections, introducing nulls (points of low frequency response) in the channel. FIGS. 20A through 20F show the 4-CAP constellation for symbols transmitted between bedroom3 1602 and kitchen 1604 for baud rates 0.14 Mbaud, 0.41 Mbaud, 0.68 Mbaud, 1.09 Mbaud, 4.35 Mbaud and 8.70 Mbaud, respectively. In FIGS. 20A through 20F, the center frequency of transmission is assumed equal to 0.8 times the baud frequency. As is shown by FIGS. 20A through 20F, the maximum baud rate for unequalized transmission of 4-CAP is somewhere below 1 Mbaud. For longer lines in shared medium 1600 the baud rate would be even lower.

The process of acquiring and processing a data packet includes three tasks: determining if the destination of the data packet matches that of the host station, if not the data packet can be discarded; decoding the identification of the source and any other information required to determine the demodulation/equalization parameters; and acquiring the correct baud phase (i.e., the correct sampling phase) for demodulating the payload data. The baud-phase is not known when a data packet is initially received because the stations are not synchronized with a common clock. The baud-phase must be precisely determined in order to demodulate the payload data using the predetermined parameters. A section of header 2101 (FIG. 21), a preamble 2102, is used for baud synchronization.

The process of acquisition uses header 2101 of data packet 2100. The length of header 2101 is overhead which affects the throughput of the network on shared medium 1600. The computation cost of processing header 2101 is also overhead which affects the cost of the network interface 300 (FIG. 3). In many embodiments of this invention, typical payload data 2104 sizes are around 100 bytes, 500 bytes, and 1000 bytes. Any size payload data 2104 can be used with this invention. If payload data 2104 is long, the header overhead is not so significant. However, if short data packets are being processed then header overhead becomes very important.

As stated previously, there is an apparent impasse in decoding the source and destination: The source and destination cannot be decoded without equalization, but equalization requires prior knowledge of the source and destination. There is also a difficulty in acquiring the baud-phase. Modems typically use a fixed-frequency tone or a combination of tones at the beginning of the data packet to enable efficient synchronization. In the case of a single tone, the absolute phase of the tone can be measured and used to determine the baud phase. For two tones, the relative phase between the tones can be used. However, in the severe channel distortion described above, there may be deep spectral nulls at arbitrary frequencies. A single fixed tone can easily be attenuated to an unusable level. Likewise, for a pair of tones, either tone could be attenuated to an unusable level. Furthermore, for a preamble that is short relative to the time of the longest echo, the channel will introduce time dispersion that could corrupt the phase measurement.

There are a number of ways to address these problems. One method would be to send a training signal with every packet. The equalization parameters can be determined from the training signal, enabling decoding of the header information fields, but this may result in high computational complexity and lost throughput due to the increased length of the data packet. This method is further discussed below. Another method is to reduce the baud rate of the header to a rate at which equalization is never needed, but this too may result in a high data packet length overhead.

A more sophisticated method is to perform linear equalization at the transmitter. Assuming that there is only one intended destination for each data packet, the transmitter could invert the channel such that the signal would not be distorted when detected by the intended destination station. Hence, no equalization would be required at the receiver. The signal would still appear distorted to the other devices on the network, but this would not matter as long as these devices had a way of determining that the packet was not intended for them. The difficulty with linear equalization, however, is that the signal to noise performance can be unacceptably poor, especially when the channel contains spectral nulls. An obvious problem scenario is when one of the preamble tones falls in a spectral null.

As an alternative to linear equalization, the header may be precoded at the transmitting station. (See G. D. Formey, Jr., and M. V. Eyuboglu, "Combined Equalization and Coding Using Precoding, IEEE C$_{omm.}$ M$_{ag.}$, December 1991, at 25–34). Precoding is a non-linear equalization method with near-optimal signal to noise performance. There are several different types of precoding that may be used but Tomlinson Precoding is probably the simplest and is appropriate equalizing the header.

Precoding, however, can not be used for baud synchronization because the resulting signal would not be tonal. Another problem with precoding is that the decoding process requires knowledge of a scale factor which could be different for each pathway. The scale factor cannot be determined easily or robustly by analysis of the precoded signal. One might wish to encode the scale factor using a sequence of bits in the header, but decoding these bits would be just as problematic as decoding the source and destination bits; it cannot be done without prior knowledge of the scale factor.

One method of acquisition has two components: First, for timing acquisition, a linearly equalized variable-frequency two-tone preamble is used; Second, for encoding information in the header, Tomlinson precoding (or some other precoding scheme) with a non-linearly quantized scale factor is used.

FIG. 21 shows a data packet 2100 for use with this method. Data packet 2100 has a header 2101 composed of a preamble 2102 and header information 2103. Data packet 2100 also has payload data 2104.

In this method, preamble 2102 comprises two tones separated in frequency by one-fourth the baud rate. Other separations of the two tones are possible. The two tones are linearly equalized at the transmitter to correct the channel distortion for a single destination. The resulting preamble, therefore, has length of about 28 symbols, including tails from the linear equalization. At higher baud rates (e.g. 10 Mbaud) the preamble may need to be lengthened.

The frequency of the tones is variable and may differ for each pair of devices in the network. A mixing frequency is chosen at training time with the objective of maximizing the signal to noise ration (SNR) at the receiver. The mixing frequency is path dependent and varies for each transmitter-receiver pair. Even over a severely distorted channel, it is highly probable that there will exist a frequency at which neither tone falls into a spectral null.

Header information 2103 is usually precoded 4-CAP (QBSK) data having, for example, 21 symbols. Both header information 2103 and preamble 2102 are precomputed in an initial training step when the network is initialized.

Figure 22:
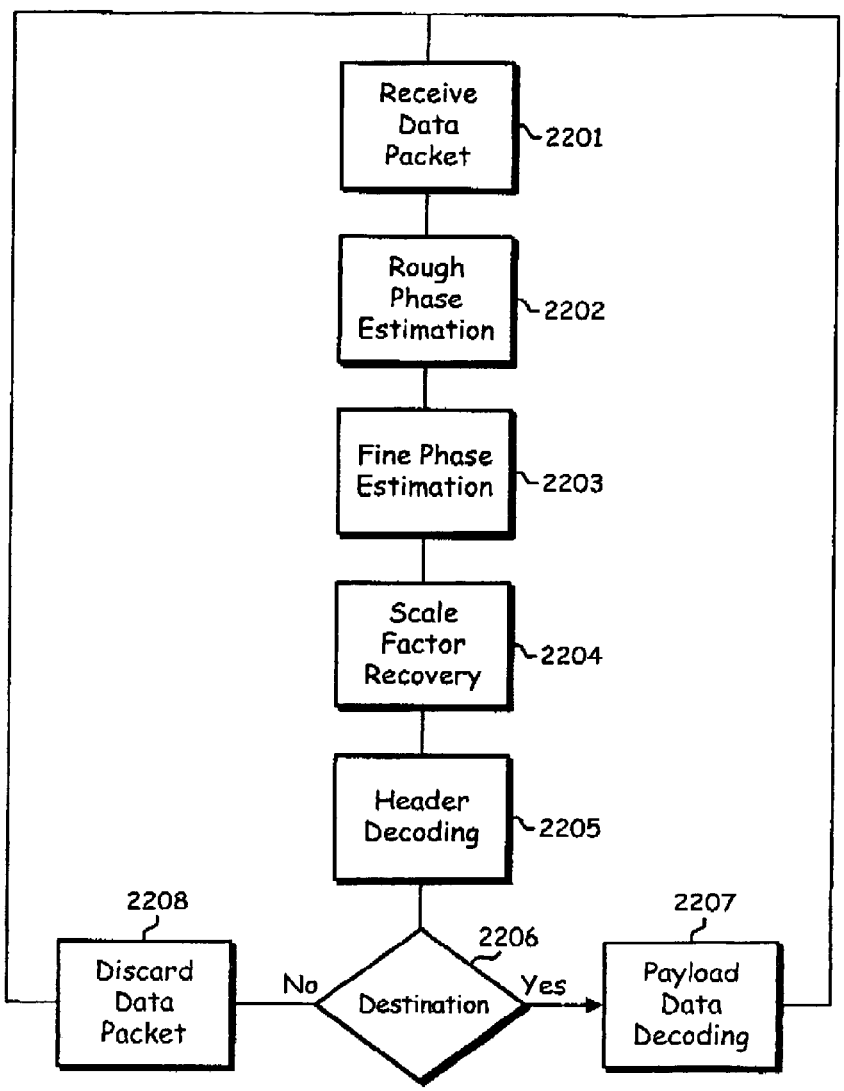
FIG. 22 shows a method of determining the baud-phase and decoding the header.

FIG. 22 shows a method of receiving a data packet, determining the baud-phase, and decoding the header. Data packet 2100 is received in host station 350 (FIG. 3) at step 2201 (FIG. 22). As was previously discussed, destination and source data is included in header information 2103 and preamble 2102 comprises two tones mixed with a prearranged mixing frequency and linearly equalized at the transmit station. In addition, header information 2103 has been precoded. Note that data packets are received from RX Queue 207 (FIG. 3) if processing is accomplished off-line or from shared medium 1600 if header processing is accomplished in the hardware on-line.

Baud-phase estimation is accomplished in two steps. First, a rough estimate is obtained using the relative phase of the two tones in rough phase estimation 2202. This step does not require knowledge of the preamble mixing frequency. Second, a fine estimate is obtained using the absolute phase of the tones in fine phase estimation 2203. The second step requires an estimate of the preamble mixing frequency. Using this method, an accurate estimate of the baud-phase can be obtained using a short preamble.

Rough baud-phase estimate 2202 estimates the rough baud-phase based on the relative phase of the two tones in preamble 2102, without any knowledge of the mixing frequency. The phase estimate is found by evaluating the phase of the discrete fourier transform of the squared received signals at the frequency equal to the tone spacing. In this example, the tone frequency is one quarter of the baud frequency, although other spacings can be used. Therefore, the rough baud-phase estimate is given by $$\emptyset_1 = (2/\pi) \text{Phase } (\Sigma_t x(t)^2 e^{-(jft/4)}), \quad (1)$$

where x(t) is the real received signal from shared medium 400, the signal coming from the two tone preamble, and f is the baud frequency.

In fine baud-phase estimation 2203, the absolute phase of the two preamble tones is used and an estimate of the mixing frequency is required. The mixing frequency is initially unknown to receiving host station 350. The mixing frequency is estimated from the power of the first derivative of the preamble signal, where the first derivative is estimated by a simple discrete time filter H(D)=1−D. The ratio of the average power of this derivative to the average power of the preamble is approximately a linear function of the mixing frequency.

To obtain the fine baud-phase estimate in fine phase estimation 2203, the preamble is filtered with complex-valued matched filters to obtain the baud-rate symbols z(n). The phase of these matched filters is chosen based on the rough baud-phase estimate. The fine baud phase estimate is then given by $$\emptyset_2 = \emptyset_1 - (f/4\pi f_m) \text{ phase } (\Sigma_n z(n)z(-n)),$$

where $f_m$ is the estimated mixing frequency.

Header information 2103 is precoded at the transmitting station using Tomlinson precoding or some other precoding scheme. Several precoding methods are known in the art. Precoding provides near-optimal performance without requiring the receiver to have any knowledge about the equalization parameters. However, the decoding step does require knowledge of the scale factor for a modulo operation. In a typical point-to-point modem application, this scale factor is known by the receiver a priori. However, where the scale factor may be different for each source-destination pair and the source is not initially known to the receiver, the scale factor is also not known to the receiver.

The scale factor is determined in scale factor recovery 2204. It can be shown that the first symbol of a Tomlinson-precoded QPSK sequence can be decoded without knowledge of the scale factor. This feature can be exploited by encoding the scale factor entirely within the first symbol. However, only a limited amount of information can be conveyed in the first symbol. If 4-CAP symbol coding is used, as is often the case for the remainder of header 2101, then a scale factor encoded in the first symbol can have only four values.

QPSK encoding involves a constellation of 4 symbols of equal magnitude with phase differences of 90 degrees between adjacent symbols. QPSK encoding is either 4-CAP (carrierless amplitude-phase modulation) or 4-QAM (quadrature amplitude modulation).

Figure 23B:
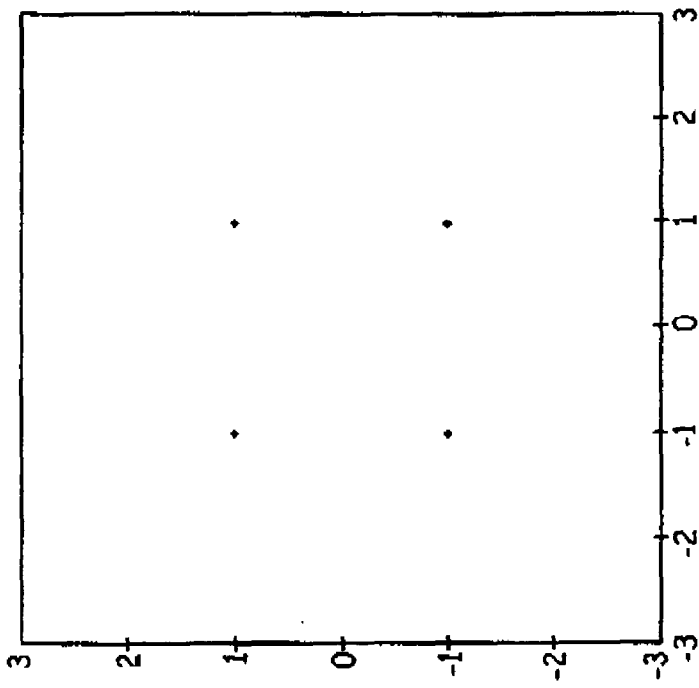
FIGS. 23A and 23B show a scale factor constellation for use in the method shown in FIG. 22 in comparison with a 4-CAP constellation.
Figure 23A:
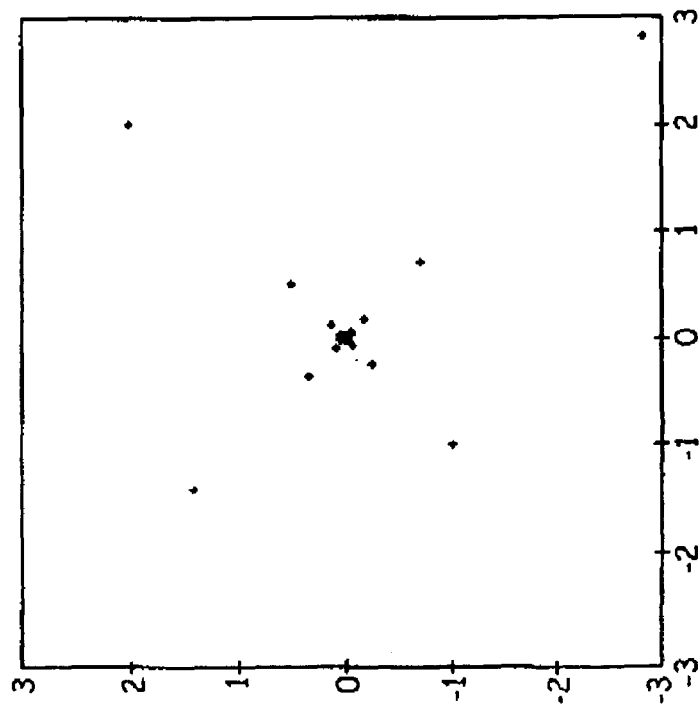

A scale factor having only four values is not sufficient. However, a method of solving this problem is to quantize the scale factor non-linearly in steps of 3 dB. Other step sizes may also be used. The phase of successive quantization steps is rotated by 90 degrees. The resulting constellation is shown in FIG. 23A. The magnitude of the scale factor symbol is twice the magnitude of symbols in a 4-CAP header constellation. The magnitude of the symbols is limited by the highest possible magnitude of the precoder output signal. The constellation in FIG. 23A can have infinitely many points, therefore there is no limit to the magnitude of the scale factor that can be communicated. The only limitation is that the scale factor can only take on quantized values (3 dB in this example).

An important characteristic of this method is that the minimum distance between the transmitted value and its nearest neighbors in the constellation is no less than the minimum distance between points in the 4-CAP constellation used for the header fields. Therefore, the noise immunity of the scale factor is at least as good as the noise immunity of the remainder of the header. For example, in FIG. 23A the minimum distance from a scale factor constellation point to its nearest neighbor is 2.12, whereas the minimum distance in the QPSK constellation shown in FIG. 23B is 2.0.

Once the scale factor is known, header information 2103 can be decoded in header decoding 2205 and the destination address recovered. In check destination 2206, the destination address is checked against the host station addresses and, if there is a match, payload data 2104 is decoded in payload data decoding 2207. If there is no match, data packet 2100 is discarded in discard data packet 2208 and host station 350 begins to process the next data packet.

Using the above method of baud-phase estimation and scaling information results in a baud sync error of generally less than 3 dB loss and a precoding scale factor quantization (affecting header 2101 only) of less than 3 dB loss. The worst case signal to noise loss in decoding header 2101 is, therefore, 6 dB. In addition, there is significant decoding complexity in decoding header 2101. Timing sync (baud-phase estimation in steps 2202 and 2203), for example, may require about 1348 real MPYA operations. Subsequent decoding of the destination requires an additional 512 real MPYAs. Timing sync and destination decoding must be accomplished for every received data packet.

During the initial training sequence of the network, each station obtains a channel model representing the channel response for communications between itself and all of the other stations. The channel model is stored (see demodulation profiles 711 and 811 in FIGS. 7 and 8) for future use, thereby "training" the equalizers.

Figure 24:
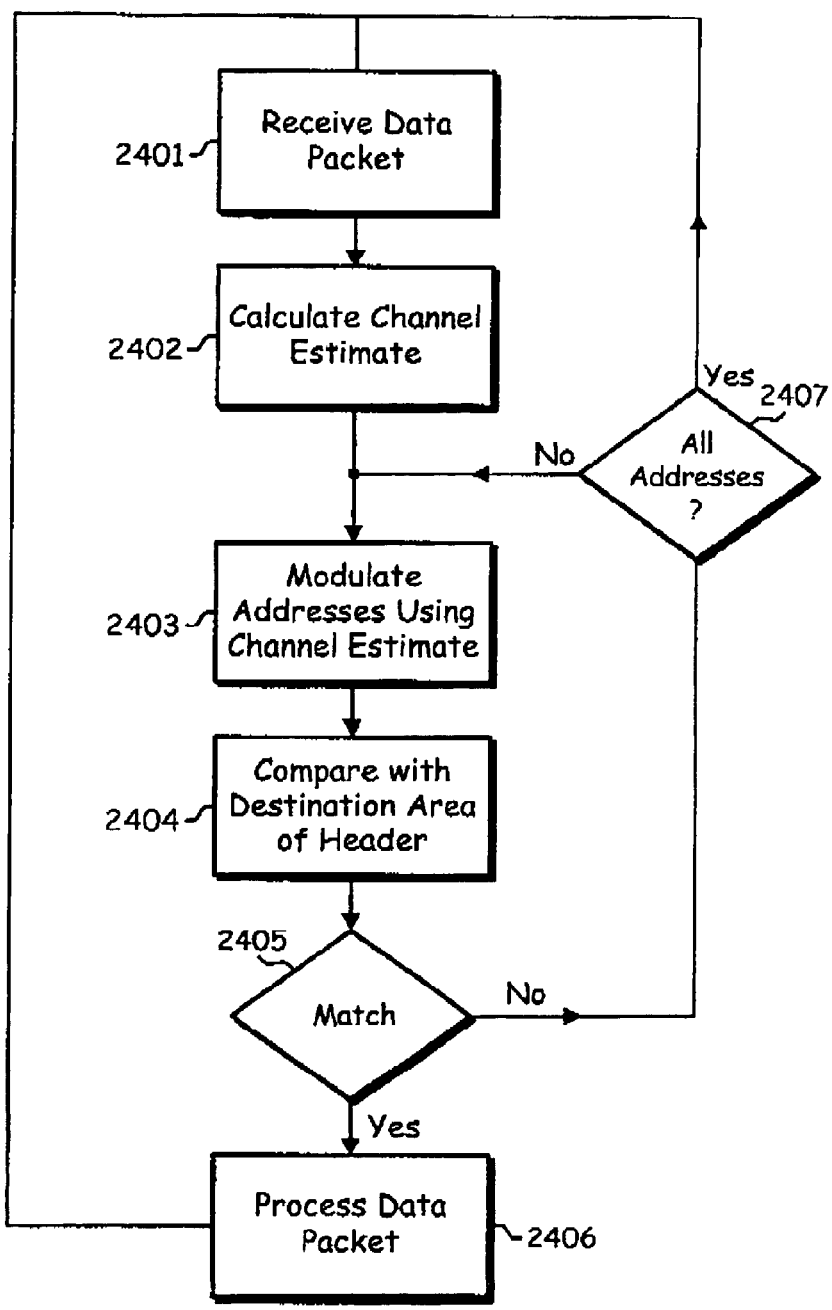
FIG. 24 shows another method of determining the header information.

An alternative method of header processing, shown in FIG. 24, involves modeling the channel for every received data packet. Data packet 2100 (FIG. 21) is received in receive data packet 2401. In this method, preamble 2102 (FIG. 21) includes a destination tag and a training sequence. The training sequence is used to obtain a channel model in calculate channel estimate 2402. The channel model can be used to either decode the destination tag and compare that with a set of one or more addresses that the station receives or each of the one or more addresses that the station receives can be encoded using the channel model for comparison with the destination tag.

In FIG. 24, each of the one or more addresses is convolved with the channel estimate in step 2403 and the result compared with the destination tag in step 2404. In step 2405, if there is no match then host station 350 (FIG. 3) checks to see if all addresses have been checked in 2407. If there is a match, data packet 2100 is processed in a process data packet step 2406. If there is no match with any address, the data packet can be discarded. If there is a match, the channel model may be refined and used to train DEMOD 601 (FIG. 6) so that header information 2103 (FIG. 21) can be demodulated to receive header information 2103.

Figure 25:
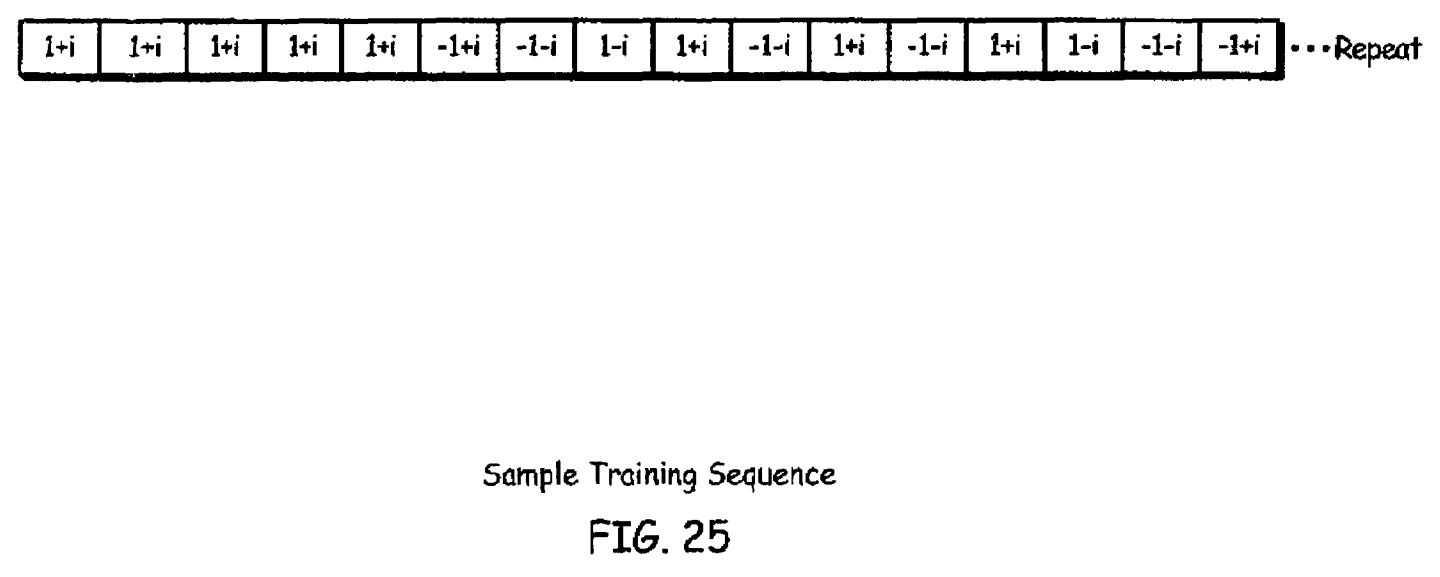

The training sequence in preamble 2102 remains fixed for every station in the network. A channel model, therefore, can be created using the known training sequence. FIG. 25 shows a sample training sequence. The training sequence in FIG. 25 is repeated some number of times, i.e. 3, in the preamble. Methods of constructing a channel model from such a training sequence are well known.

If the training sequence is a periodic sequence of period N where N is a power of two greater than or equal to the maximum channel length, a calculation of the channel model that often involves only addition operations can be performed, greatly reducing the computation overhead. For N=4, 8, or 16, the training sequence may consist entirely of QPSK (4-QAM or 4-CAP) symbols and the channel estimation requires only additions. For N=4, the training sequence may also consist entirely of BPSK symbols using a constellation of 2 symbols of equal magnitude with phase differences of 180 degrees. For N=32, the training sequence may consist entirely of zero-interleaved QPSK symbols or 8-PSK symbols. An 8-PSK symbology has a constellation of 8 symbols of equal magnitude with phase difference of 45 degrees between adjacent symbols. For N=64, the training sequence may consist entirely of 8-PSK symbols and requires only a small number of multiplications for constructing the channel estimate.

Computing the equalizer parameters from this channel model, however, is computationally intensive. A destination tag in header 2101 can be checked by comparing the destination tag with a set of tags associated with the host station. If a match occurs, then the additional computation required to obtain the equalizer parameters and train the equalizer is undertaken. Note that in this method, equalization parameters are not necessarily stored in a modulation profiles look-up table 711 and 811 as is shown in FIGS. 7 and 8.

The above examples are demonstrative of the invention only. Variations of these examples which are obvious to one skilled in the art are within the scope of this invention. As such, this invention is limited only by the following claims.

We claim:

1. A network interface for a host station, comprising:
a receiver interfaced to a shared medium, the shared medium connecting the receiver to a set of transmit stations capable of transmitting a series of data packets over the shared medium, the receiver receiving a receive data packet and generating a sample packet based on the receive data packet, the receive data packet being one of the series of data packets which is designated for receipt by the host station;
a receive queue for holding a plurality of sample packets, the sample packet being one of the plurality of sample packets in the receive queue;
an off-line processor for processing the plurality of sample packets held in the receive queue into digitized data receivable by the host station, the off-line processor processing the sample packet independently of the receiver processing the receive data packet;
and a carrier/header detect connected to a receive CODEC and interfaced to the shared medium, the carrier/header detect generating a trigger signal upon detecting the receive data packet.

2. The interface of claim 1, wherein:
the receive CODEC receives the receive data packet from the shared medium and creates the sample packet based on the receive data packet, the receive CODEC functioning only when receiving a trigger signal; and;
and a carrier/header detect connected to a receive CODEC and interfaced to the shared medium, the carrier/header detect generating a trigger signal upon detecting the receive data packet;
a carrier/header detect connected to the receive CODEC and interfaced to the shared medium, the carrier/header detect generating the trigger signal upon detecting the receive data packet.

3. The interface of claim 1, wherein the series of data packets are burst-oriented packets and the carrier/header detect detects a start of each of the burst-oriented packets.

4. The interface of claim 1, wherein the series of data packets are embedded in a continuous bit stream and the carrier/header detect detects a start of each of the series of data packets.

5. The interface of claim 4, wherein each of the series of data packets has boundaries marked by a unique symbol sequence, the carrier/header detect detecting the unique symbol sequence.

6. The interface of claim 4, wherein each of the series of data packets has boundaries marked with side-band framing signals carried on separate frequency division carriers.

7. The network interface of claim 2, wherein the off-line processor receives digitized data from the host station and processes that data into a transmit packet, and further comprising:
 a transmit queue connected to the off-line processor for receiving and storing the transmit packet; and
 a transmitter connected to the transmit queue and interfaced to the shared medium, the transmitter processing the transmit packet into a transmit data packet and transmitting the transmit data packet on the shared media for receipt by at least one of a set of receive stations.

8. The interface of claim 7, wherein the transmitter comprises a transmitter CODEC connected to the transmit queue to receive the transmit packet and interfaced to the shared medium to transmit the transmit data packet.

9. The interface as in claim 8, wherein the transmitter CODEC functions only when receiving a transmit signal, the carrier/header detect generates a carrier receive signal upon detection of one of the series of data packets, and further comprising:
 a collision detect interfaced to the shared medium to receive the one of the series of data packets and also connected to the transmit CODEC to receive the transmit data packet, the collision detect generating a collision signal when a data collision is detected;
 a MAC controller connected to the carrier/header detect to receive the carrier receive signal and connected to the collision detect to receive the trigger signal, the MAC controller generating the transmit signal for the transmit CODEC only if the carrier signal is not present and the data collision is not detected.

10. The interface of claim 9, wherein the sample packet is formed by sampling and digitizing the data packet.

11. The interface of claim 10, wherein the transmit packet is formatted identically with the sample packet.

12. The interface of claim 9, wherein the carrier/header detect determines whether or not one of the series of data packets is destined for the host station by reading a destination from a header of the one of the series of data packets.

13. The interface of claim 9, wherein the carrier/header detect determines whether or not one of the series of data packets is destined for the host station by deducing a destination from comparing a time of receipt of the one of the series of data packets with the time of receipt of others of the series of data packets on the shared medium.

14. The interface of claim 9, wherein the carrier/header detect determines whether or not the one of the series of data packets is destined for the host station by deducing the destination from the one of the series of data packets.

15. The interface of claim 9, wherein the carrier/header detect determines whether or not one of the series of data packets is destined for the host station by deducing a destination of the one of the series of data packets from prior communications with one of the set of stations that transmitted the one of the series of data packets.

16. The interface of claim 9, wherein a tag is modulated into a header of the receive data packet, a destination of the one of the series of data packets being determined by comparing the tag to a unique tag assigned to the host station.

17. The interface of claim 16, wherein the unique tag symbol sequence is convolved with a channel estimate and compared with an appropriate portion of the received data packet.

18. The interface of claim 9, wherein a destination of the one of the series of data packets is determined by pattern matching of a fixed signal preamble unique to the destination.

19. The interface of claim 9, wherein a destination of the one of the series of data packets is determined by demodulating a CDMA sub-channel superimposed on the main channel modulation.

20. The interface of claim 9, wherein a destination of the one of the series of data packets is determined from header information conveyed in a frequency division sub-channel separate from that used for the receive data.

21. The interface of claim 9, wherein the off-line processor includes a dedicated embedded processor, a microprocessor, a digital signal processor or a mediaprocessor.

22. The interface of claim 21, wherein the off-line processor performs signal processing in software or in firmware.

23. The interface of claim 22, wherein the off-line processor includes shared components, the shared components being a dedicated embedded processor, a microprocessor, a digital signal processor or a mediaprocessor.

24. The interface of claim 23, wherein the off-line processor includes a dedicated hardware processor, the dedicated hardware processor performing application specific signal processing.

25. The interface of claim 9, wherein the shared medium is twisted pair cable, coaxial cable, power line wiring, optical cable, wireless RF or wireless IR.

26. The interface of claim 9, further including a hybrid connected to the shared medium wherein the receive CODEC, the transmit CODEC, the carrier/header detect, and the collision detect are interfaced to the shared medium through the hybrid.

27. The interface of claim 9, wherein the series of data packets are each characterized by a set of parameters, the set of parameters including a modulation data rate, a modulation coding format, and a data packet format, and the set of parameters varying between each of the series of data packets.

28. The interface of claim 27, wherein the set of parameters for each of the series of data packets are optimized for a set of channel characteristics describing transmission between the host station and one of the set of stations.

29. The interface of claim 28, wherein the set of parameters is also optimized for a set of network interface capabilities between the host station and the one of the set of stations.

30. The interface of claim 27, wherein the set of parameters for the receive data packet are determined by reading the set of parameters from a header of the data packet.

31. The interface of claim 27, wherein the set of parameters for the receive data packet are determined by deducing the set of parameters from timing of the receive data packet in relation to the series of data packets.

32. The interface of claim 27, wherein the set of parameters for the receive data packet are determined by deducing the set of parameters from one of the set of stations that transmitted the receive data packet.

33. The interface of claim 27, wherein the set of parameters is deduced from the receive data packet.

34. The interface of claim 9, and further including at least one other receiver and at least one other transmitter, the at least one other receiver and the at least one other transmitter being interfaced to one of at least one other shared medium, the at least one other transmitter being connected to the transmit queue to receive a media dependent transmit packet and transmitting a media dependent transmit data packet based on the media dependent transmit packet, the at least one other receiver receiving a media dependent receive data packet from the at least one other shared medium and sending a media dependent sample packet to the receive queue.

35. The interface of claim 34, wherein the media dependent sample packet identifies the at least one other receiver and the media dependent transmit packet identifies the at least one other transmitter.

36. The interface of claim 34, wherein the at least one other shared medium includes the shared medium where a modulation frequency of the at least one other receiver and the at least one other transmitter differs from a modulation frequency of the receiver and the transmitter.

37. The interface of claim 9, wherein the off-line processor comprises:
a demodulator connected to the receive queue and the host station, the demodulator receiving the sample packet and performing signal processing to generate host formatted data; and
a modulator connected to the transmit queue and the host station, the modulator receiving host formatted data from the host station and generating the transmit packet.

38. The interface of claim 37, wherein the demodulator comprises:
a resampler connected to receive the sample packet and that adjusts the sample packet modulation and phase;
an RX filter connected to the resampler, the RX filter amplifying and filtering a signal from the resampler;
an equalizer receiving a signal from the RX filter and removing intersymbol interference effects;
a slicer connected to the equalizer and deciding on output symbols based on a signal from the equalizer; and
error correction circuits that receive the output symbols from the slicer and statistically adjust the output symbols to form a host data stream.

39. The interface as in claim 38, wherein the equalizer is a decision feedback equalizer with adaptively chosen parameters.

40. The interface as in claim 38, wherein the adaptively chosen parameters are stored in a table to provide for adaptation across successive packet transmissions.

41. The interface as in claim 38, wherein the equalizer is a linear equalizer with adaptively chosen parameters.

42. The interface as in claim 41, wherein the adaptively chosen parameters are stored in a table to provide for adaptation across successive packet transmissions.

43. The interface of claim 38, wherein the receiver performs a partial signal processing function.

44. The interface of claim 43, wherein the partial signal processing function includes timing recovery.

45. The interface of claim 44, wherein the timing recovery is based on the header of the data packet.

46. The interface of claim 37, wherein the error correction circuits are applied to the output symbols optionally.

47. The interface of claim 46, wherein the error correction circuits are applied to the output symbols when the demodulated data appears to be received in error.

48. The interface of claim 37, wherein the data packet includes several carriers and the demodulator comprises:
a resampler connected to receive the sample packet and that adjusts the sample packet modulation and phase;
an RX filter connected to the resampler, the RX filter amplifying and filtering a signal from the resampler;
an equalizer receiving a signal from the RX filter and removing intersymbol interference effects;
a fast fourier transformer which converts an equalized signal from the equalizer to a transformed signal representing phase and amplitudes for the several carriers;
a multichannel slicer which receives the transformed signals and produces symbol estimates; and
error correction circuit that receive the symbol estimates and further demodulates and decodes the transformed signal to form a host data stream.

49. The interface as in claim 48, wherein the equalizer is a linear equalizer with adaptively chosen parameters.

50. The interface as in claim 48, wherein the receiver performs a partial signal processing function.

51. The interface of claim 48, wherein the partial signal processing function includes timing recovery.

52. The interface as in claim 48, wherein the timing recovery is based on the header of the data packet.

53. The interface of claim 9, wherein:
the off-line processor computes an echo replica of the transmit packet and stores the echo replica in the transmit queue with the transmit packet; and
the collision detect receives the echo replica, subtracts the echo replica from one of the series of data packets to form
a difference level, and generates the collision signal if the difference level is above a predetermined threshold.

54. The interface of claim 9, wherein: an echo replica of a fixed portion of the transmit packet is computed and stored by the off-line processor; and
the collision detect subtracts the echo replica from a corresponding portion of one of the series of data packets to form a difference level, and generates the collision signal if the difference level is above a predetermined threshold.

55. The interface of claim 9, wherein the carrier/header detect and collision detect detects noise on the shared medium and treats the noise as if it were the data collision.

56. The interface of claim 9, wherein;
an echo replica of a fixed portion of the transmit packet is synchronously sampled from the shared medium during a prior transmission and stored by the host station; and
the collision detect subtracts the echo replica from a corresponding portion of one of the series of data packets to form a difference level and generates the data collision signal if the difference level is above a predetermined threshold.

57. The network interface of claim 1, wherein the off-line processor receives digitized data from the:
host station and processes that data into a transmit packet, and further comprising:
a transmit queue connected to the off-line processor for receiving and storing the transmit packet; and
a transmitter connected to the transmit queue and interfaced to the shared medium, the transmitter processing the transmit packet into a transmit data packet and transmitting the transmit data packet on the shared media for receipt by at least one of a set of receive stations.

58. The interface of claim 57, wherein the receiver and the transmitter are both implemented on an integrated circuit chip and the transmit queue is implemented on the integrated circuit chip and the receive queue is implemented on the integrated circuit chip.

59. The interface of claim 57, wherein the receiver and the transmitter are implemented on an integrated circuit chip and the transmit queue is not implemented on the integrated circuit chip and the receive queue is not implemented on the integrated circuit chip.

60. The interface of claim 57, wherein the transmit queue and the receive queue each include a portion of a memory of the host station.

61. The interface of claim 1, wherein the sample packet is formed by sampling and digitizing the data packet.

62. The interface of claim 1, wherein the receiver and the receive queue are implemented on an integrated circuit chip.

63. The interface of claim 1, wherein the receiver is implemented on an integrated circuit chip and the receive queue is not implemented on the integrated circuit chip.

64. The interface of claim 63, wherein the receive queue includes part of a memory of the host station.

65. A method of network interfacing between a host station and a set of stations, comprising:
receiving a data packet from a shared medium, the shared medium connecting the host station with the set of other stations;
detecting that the data packet is a receive data packet that is directed toward the host station;
converting the receive data packet to a sample packet;
storing the sample packet in a receive queue;
performing signal processing on the sample packet to obtain host formatted data, the signal processing being performed separately and independently in an off-line processor; and
sending the host formatted data to the host station; and generating a trigger signal upon detecting the receive data packet.

66. The method of claim 65, wherein receiving a data packet comprises recognizing boundaries of the data packet.

67. The method of claim 66, wherein the data packet is a burst-oriented packet.

68. The method of claim 66, wherein the data packet is embedded in a continuous bit stream and the boundaries of the data packet are marked by a unique symbol sequence.

69. The method of claim 66, wherein the data packet is imbedded in a continuous bit stream and the boundaries are marked with side-band framing signals carried on separate frequency division carriers.

70. The method of claim 65, further comprising:
receiving host formatted data from the host station; converting the host formatted data to a transmit packet;
storing the transmit packet in a transmit queue;
converting the transmit queue to a transmit data packet; and
transmitting the transmit data packet onto the shared medium.

71. The method of claim 70, wherein converting the host formatted data to the transmit data packet comprises converting from digital format to digitized data packet format.

72. The method of claim 70, wherein converting the transmit packet to data packet format comprises performing a digital to analog conversion.

73. The method of claim 70, wherein transmitting the transmit data packet comprises:
detecting whether or not another data packet exists on the shared medium;
detecting whether or not there exists a data collision;
transmitting the transmit data packet to the shared medium in the absence of another data packet and the data collision;
rescheduling transmission for another time if the data collision condition occurs.

74. The method of claim 70, further comprising detecting noise on the shared medium and treating the noise as if it were a data collision.

75. The method of claim 65, wherein converting the receive data packet to the sample packet comprises sampling and digitizing the receive data packet.

76. The method of claim 65, wherein detecting that the data packet is the receive data packet comprises reading a destination from a header of the data packet and determining that the destination is the host station.

77. The method of claim 65, wherein detecting that the data packet is the receive data packet comprises determining a destination from timing receipt of the data packet in relation to previously received data packets and determining that the destination is the host station.

78. The method of claim 65, wherein detecting that the data packet is the receive data packet comprises deducing a destination from contents of the data packet or a header of the data packet and determining that the destination is the host station.

79. The method of claim 65, wherein detecting that the data packet is the receive data packet comprises deducing a destination from one of the set of other stations that sent the data packet and determining that the destination is that of the host station.

80. The method of claim 65, wherein detecting that the data packet is the receive data packet comprises:
demodulating a tag from a header of the data packet; and
comparing the tag to a unique tag assigned to the host station.

81. The method of claim 65, wherein detecting that the data packet is the receive data packet comprises comparing a received symbols from a header of the data packet with a convolution of the channel estimate made from a received header with a unique tag assigned to the host station.

82. The method of claim 65, wherein detecting that the data packet is the receive data packet comprises matching a preamble of the data packet to a fixed signal preamble unique to the host station.

83. The method of claim 65, wherein detecting that the data packet is the receive data packet comprises reading a destination from a CDMA overlay.

84. The method of claim 65, wherein detecting that the data packet is the receive data packet comprises reading a destination from header information conveyed in a frequency division sub-channel separate from that used for the data packet.

85. The method of claim 65, wherein performing signal processing on the sample packet comprises:
determining proper modulation and phasing for the receive data packet;
resampling the sample packet to reflect the proper modulation and phasing;
filtering the sample packet to remove effects of flat loss and band-limiting the received signal with a matched filter;
removing intersymbol interference from the sample packet to create a filtered sample packet;
determining a sequence of output symbols from the filtered sample packet; and
converting output symbols to a bitstream by decoding coding functions that were applied at a transmitter.

86. The method of claim 85 wherein determining the proper modulation and phasing comprises reading a header of the data packet to determine channel characteristics and looking up parameters in a modulation profiles table.

87. The method of claim 85, wherein determining the proper modulation and phasing comprises deducing the proper modulation and phasing from contents of the data packet.

88. The method of claim 85, wherein determining the proper modulation and phasing comprises deducing the proper modulation and phasing from timing of the data packet in relation to previous data packets.

89. The method of claim 85, wherein determining the proper modulation and phasing comprises deducing the proper modulation and phasing from previously received data packets.

90. The method of claim 85 wherein removing the intersymbol interference comprises passing the sample packet data through an equalizer filter.

91. The method of claim 85 wherein the equalizer filter includes a decision feedback filter.

92. The method of claim 85 wherein determining the sequence of output symbols comprises:
 mapping the output symbols to a bit stream:
 estimating a maximum likelihood sequence with a Viterbi decoder; and
 error correcting the maximum likelihood sequence using a Reed-Solomon block decoder.

93. The method of claim 85, wherein determining the sequence of output symbols comprises:
 mapping the output symbols to a bit stream; and
 on the presence of an option, estimating a maximum likelihood sequence with a Viterbi decoder, and error correcting the maximum likelihood sequence using a Reed-Solomon block decoder.

94. The method of claim 93, wherein the option is present when the demodulated data appears to be received in error.

95. The method of claim 93, wherein the option is present when signaled in a header of the data packet.

96. The method of claim 85, wherein determining the sequence of output symbols comprises:
 mapping the output symbols to a bit stream;
 estimating a maximum likelihood sequence with a Viterbi decoder using soft-decision outputs from a multi-channel slicer; and
 error correcting the maximum likelihood sequence using a Reed-Solomon block decoder.

97. The method of claim 65, wherein performing signal processing on the sample packet comprises:
 determining proper modulation, phasing and decoding functions for the receive data packet;
 resampling the sample packet to reflect the proper modulation and phasing;
 filtering the sample packet to remove effects of flat loss and band-limiting the received signal with a matched filter;
 removing intersymbol interference from the sample packet with a linear equalizer having adaptively chosen parameters to create a filtered sample packet:
 transforming an equalized signal with a fast fourier transform to obtain a transformed signal representing phase and amplitude for multiple carriers; and
 converting the transformed signal to a host data bitstream by decoding coding functions that were applied at a transmitter.

98. The method of claim 97, wherein determining the proper modulation, phasing and decoding functions comprises reading a header of the data packet to determine channel characteristics and looking up parameters in a modulation profiles table.

99. The method of claim 97, wherein determining the proper modulation, phasing and decoding functions comprises deducing the proper modulation and phasing from contents of the data packet.

100. The method of claim 97, wherein determining the proper modulation, phasing and decoding functions comprises deducing the proper modulation and phasing from timing of the data packet in relation to previous data packets.

101. The method of claim 97, wherein determining the proper modulation, phasing and decoding functions comprises deducing the proper modulation and phasing from previously received data packets.

102. The method of claim 97, wherein the adaptively chosen parameters of the linear equalizer are stored in a table to provide for adaptation across successive packet transmission.

* * * * *